United States Patent
Cansizoglu et al.

(10) Patent No.: US 11,630,877 B1
(45) Date of Patent: Apr. 18, 2023

(54) CUSTOM VISUAL CODES FOR NETWORK LINKS

(71) Applicant: Snap Inc., Santa Monica, CA (US)

(72) Inventors: Omer Cansizoglu, Los Angeles, CA (US); Caleb Ogden, Playa Vista, CA (US); Kirk Ouimet, Orem, UT (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/667,361

(22) Filed: Aug. 2, 2017

Related U.S. Application Data

(60) Provisional application No. 62/449,893, filed on Jan. 24, 2017.

(51) Int. Cl.
| | | |
|---|---|---|
| *G06F 16/955* | (2019.01) | |
| *G06F 40/134* | (2020.01) | |
| *H04L 67/02* | (2022.01) | |
| *H04L 65/1063* | (2022.01) | |
| *G06F 3/0482* | (2013.01) | |
| *G06K 19/06* | (2006.01) | |
| *G06K 7/14* | (2006.01) | |
| *H04L 51/52* | (2022.01) | |
| *H04L 67/01* | (2022.01) | |

(52) U.S. Cl.
CPC ........ *G06F 16/9554* (2019.01); *G06F 40/134* (2020.01); *G06F 3/0482* (2013.01); *G06K 7/1417* (2013.01); *G06K 19/06037* (2013.01); *H04L 51/52* (2022.05); *H04L 65/1063* (2013.01); *H04L 67/01* (2022.05); *H04L 67/02* (2013.01)

(58) Field of Classification Search
CPC ........... G06F 17/30879; G06F 17/2235; G06F 17/0482; G06F 3/0482; G06F 40/134; G06F 16/9554; H04L 65/1063; H04L 67/02; H04L 67/01; H04L 51/52; G06K 7/1417; G06K 19/06037

See application file for complete search history.

(56) References Cited

U.S. PATENT DOCUMENTS

| | | | |
|---|---|---|---|
| 6,038,295 | A  | 3/2000 | Mattes |
| 6,980,909 | B2 | 12/2005 | Root et al. |
| 7,173,651 | B1 | 2/2007 | Knowles |
| 7,411,493 | B2 | 8/2008 | Smith |
| 7,535,890 | B2 | 5/2009 | Rojas |

(Continued)

FOREIGN PATENT DOCUMENTS

| | | |
|---|---|---|
| CA | 2887596 A1 | 7/2015 |

OTHER PUBLICATIONS

Garg, Gautam "QR Code Generator with Logo: Personalize your QR Codes" Nov. 12, 2016 Scanova Retrieved at https://web.archive.org/web/20161112215906/https://scanova.io/blog/blog/2015/04/17/qr-code-generator-with-logo/.*

(Continued)

*Primary Examiner* — Stephen S Hong
*Assistant Examiner* — Nicholas Hasty
(74) *Attorney, Agent, or Firm* — Schwegman Lundberg & Woessner, P.A.

(57) ABSTRACT

A user can create a customizable visual code that is associated with a network address of a page. The customizable visual data can be integrated with one or more user selected images and data marks. When the customizable visual code is scanned, one or more pages may be displayed on the scanning device.

20 Claims, 22 Drawing Sheets

(56) References Cited

U.S. PATENT DOCUMENTS

| | | | |
|---|---|---|---|
| 8,131,597 B2 | 3/2012 | Hudetz | |
| 8,199,747 B2 | 6/2012 | Rojas et al. | |
| 8,332,475 B2 | 12/2012 | Rosen et al. | |
| 8,718,333 B2 | 5/2014 | Wolf et al. | |
| 8,724,622 B2 | 5/2014 | Rojas | |
| 8,874,677 B2 | 10/2014 | Rosen et al. | |
| 8,909,679 B2 | 12/2014 | Root et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,111,164 B1* | 8/2015 | Anderton | G06K 7/1413 |
| 9,191,776 B2 | 11/2015 | Root et al. | |
| 9,204,252 B2 | 12/2015 | Root | |
| 9,443,227 B2 | 9/2016 | Evans et al. | |
| 9,489,661 B2 | 11/2016 | Evans et al. | |
| 9,491,134 B2 | 11/2016 | Rosen et al. | |
| 9,723,253 B2 | 8/2017 | Tsujimoto | |
| 9,911,073 B1 | 3/2018 | Spiegel et al. | |
| 2006/0184875 A1* | 8/2006 | Okada | H04N 5/44582 715/224 |
| 2008/0168154 A1 | 7/2008 | Skyrm et al. | |
| 2011/0202598 A1 | 8/2011 | Evans et al. | |
| 2012/0209924 A1 | 8/2012 | Evans et al. | |
| 2013/0021364 A1* | 1/2013 | Azuma | G06K 19/06103 345/589 |
| 2013/0228629 A1 | 9/2013 | Fan et al. | |
| 2013/0332856 A1* | 12/2013 | Sanders | G06F 3/0488 715/753 |
| 2014/0109046 A1* | 4/2014 | Hirsch | G06F 8/60 717/120 |
| 2014/0325346 A1* | 10/2014 | Liu | H04L 67/02 715/238 |
| 2014/0365854 A1* | 12/2014 | Karunamuni | G06F 3/0483 715/205 |
| 2016/0027042 A1* | 1/2016 | Heeter | G06Q 30/0248 705/14.47 |
| 2018/0091303 A1 | 3/2018 | Brook et al. | |
| 2018/0205681 A1 | 7/2018 | Gong et al. | |
| 2018/0349485 A1* | 12/2018 | Carlisle | G06F 16/958 |

OTHER PUBLICATIONS

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

* cited by examiner

CUSTOM VISUAL CODES FOR NETWORK LINKS

PRIORITY CLAIM

This application claims the benefit of priority of U.S. Patent Provisional Application Ser. No. 62/449,893, filed on Jan. 24, 2017, which is hereby incorporated by reference herein in its entirety

TECHNICAL FIELD

Embodiments of the present disclosure relate generally to network content and, more particularly, but not by way of limitation, to custom visual codes for network links.

BACKGROUND

Users can access webpages by directly entering network addresses, e.g., uniform resource locators (URLs), into a browser. However, network addresses can be very long (e.g., +50 characters) and can contain hard to memorize sequences and symbols (e.g., %, ?, $, #). Further, the addresses typically are strings of characters and cannot be visually customized by the users.

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Pages of a network site can (e.g., webpages) can be accessed directly by inputting network addresses, e.g., URLS, of the pages into a browser (e.g., mobile app, web browser). However, network addresses can be very long (e.g., 50 characters) and can contain hard to memorize sequences and symbols (e.g., %, ?, $, #). Further, the addresses typically are strings of characters and cannot be visually customized by the users.

To this end, a coded link system is configured to receive a network address and create a scannable image that links to a webpage located at the network address. The scannable image can be customized with an image from the page, which the coded link system may automatically retrieve from the webpage upon receiving the network address. In some example embodiments, several available images from the page are displayed to the user and the user selects one of the images for integration into the scannable image. The coded link system can then scan the scannable image using a client device (e.g., smartphone) and cause the client device to retrieve and display the page. In this way, users can create customizable scannable codes that do not require memorization of long URLs. Further, by integrating an image from the page into the scannable image, the scannable image previews the content to which it links (e.g., the page). This allows users scanning the scannable image to trust the image and the content to which it links. Further, user experience is enhanced as the codes can be more visually pleasing and fun for users to use.

Figure 1:
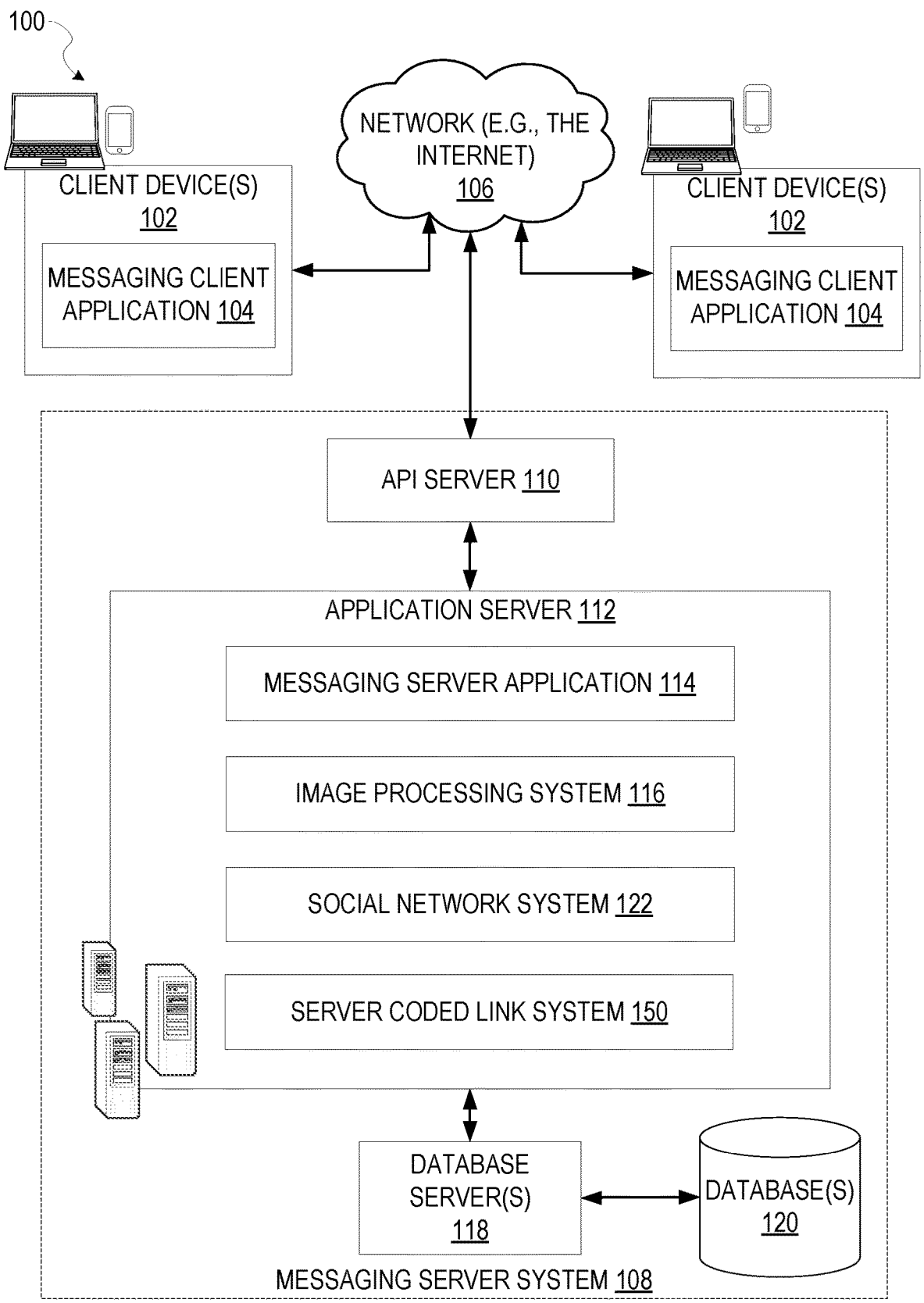
FIG. 1 is a block diagram showing an example messaging system for exchanging data (e.g., messages and associated content) over a network.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, and to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, a social network system 122, and a server coded link system 150. The messaging server application 114 implements a number of message-processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user.

The application server 112 is communicatively coupled to a database server 118, which facilitates access to a database 120 in which is stored data associated with messages processed by the messaging server application 114.

Figure 2:
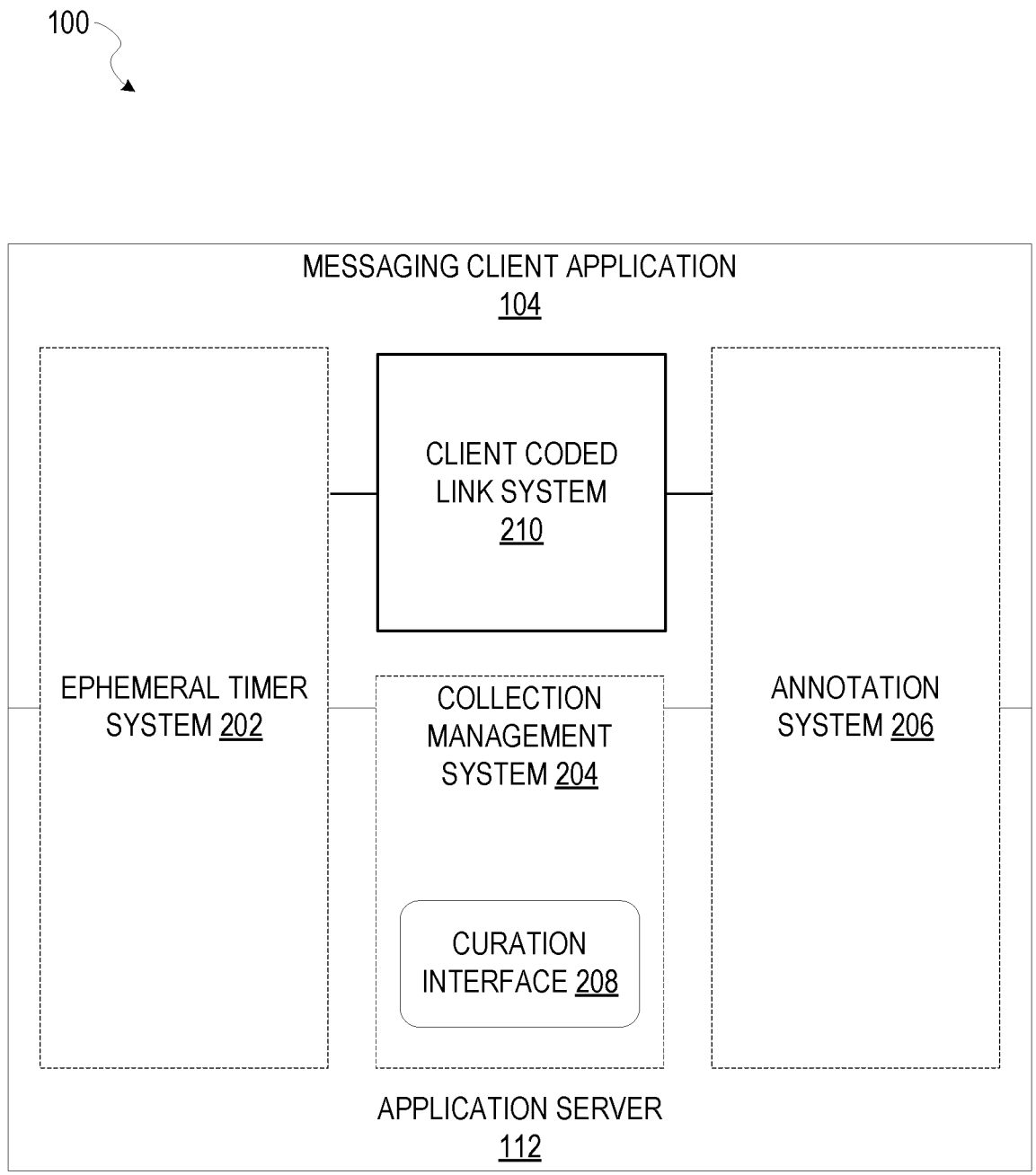
FIG. 2 is block diagram illustrating further details regarding a messaging system having an integrated virtual object machine learning system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and a client coded link system 210.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a SNAPCHAT Story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT Geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, text, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

Figure 3:
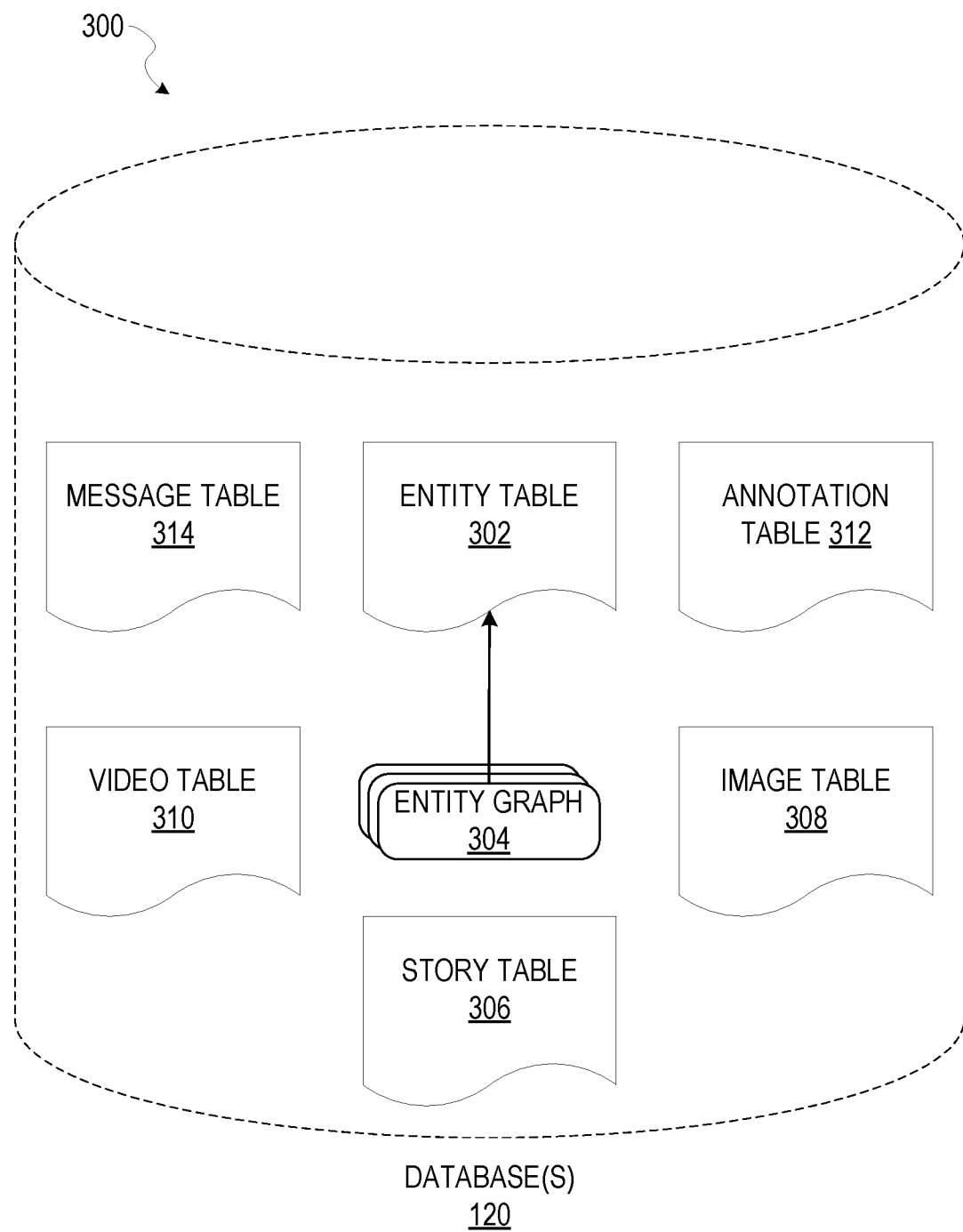
FIG. 3 is a schematic diagram illustrating data which may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interest-based, or activity-based, for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT Story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
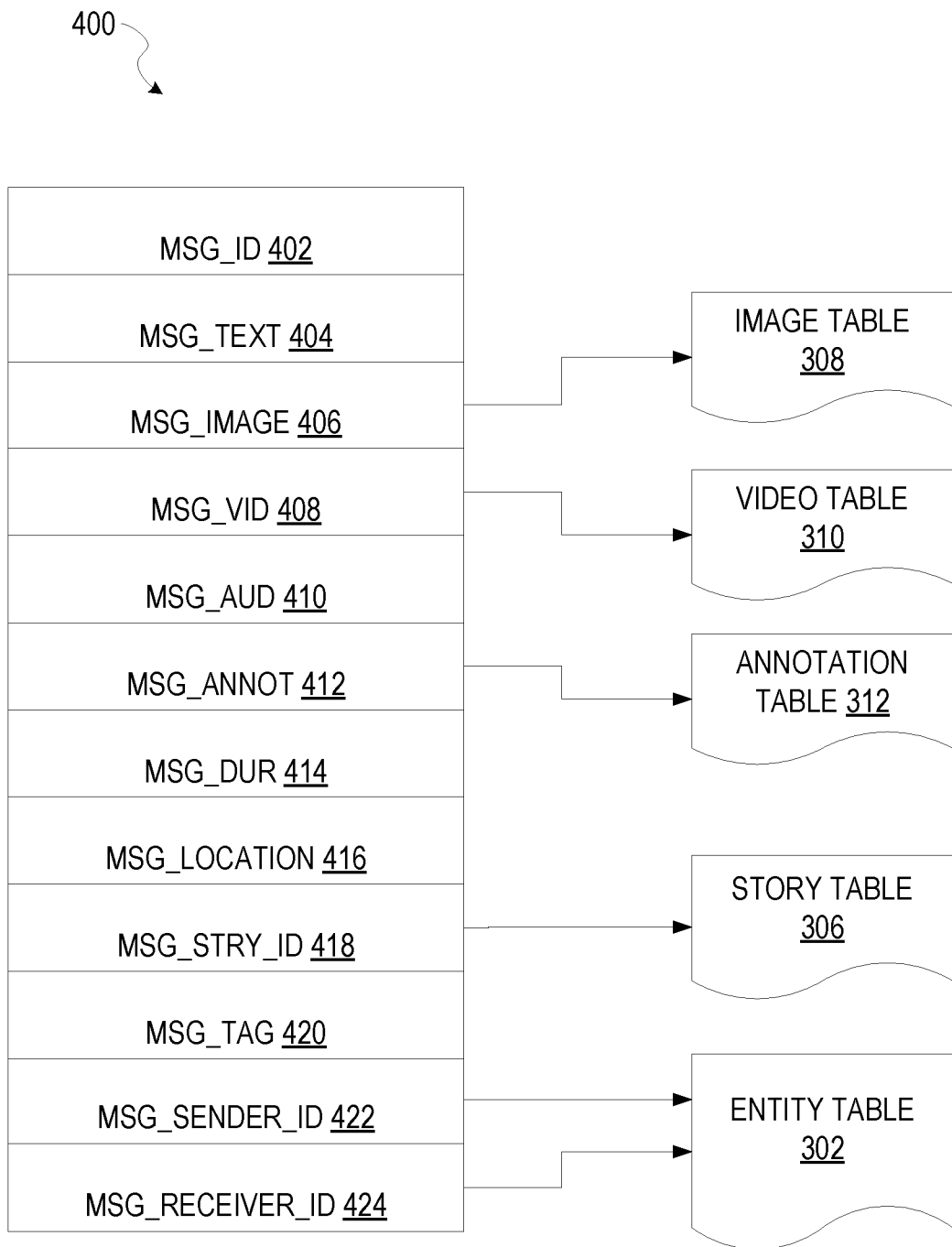
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data captured by a camera component of a client device 102 or retrieved from memory of a client device 102, and that is included in the message 400.

A message video payload 408: video data captured by a camera component or retrieved from a memory component of the client device 102, and that is included in the message 400.

A message audio payload 410: audio data captured by a microphone or retrieved from the memory component of the client device 102, and that is included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).

A message story identifier 418: identifies values identifying one or more content collections (e.g., "stories") with which a particular content item in the message image payload 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
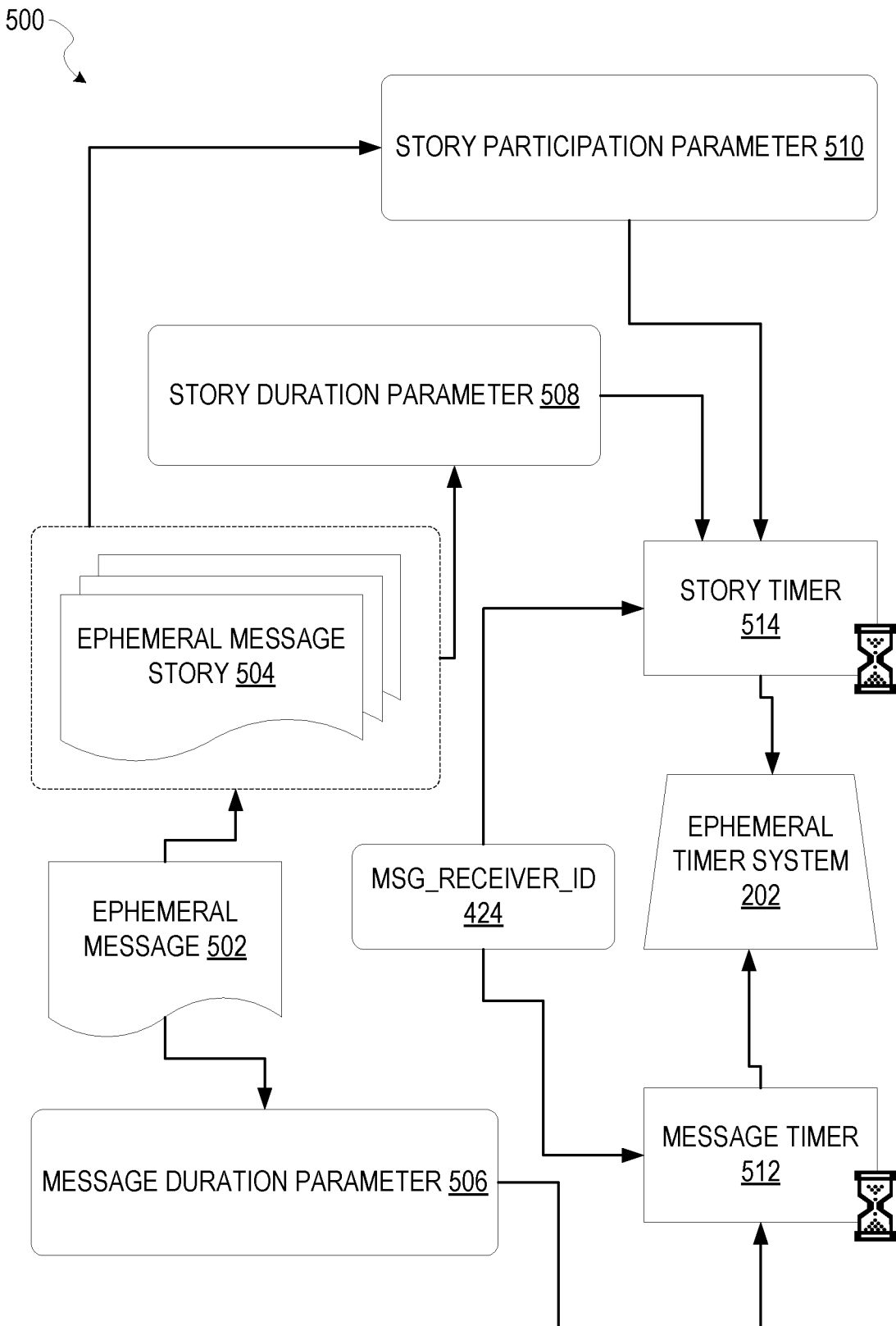
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT Story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of the ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6A:
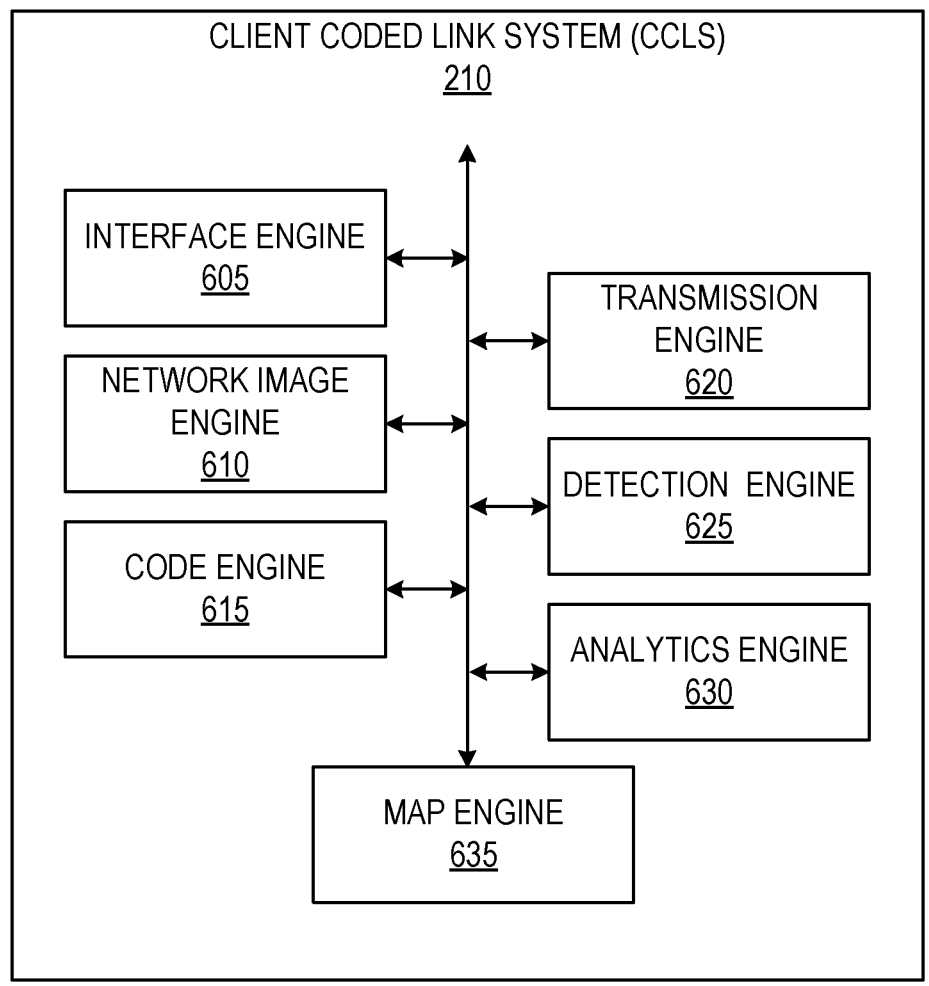
FIG. 6A shows example functional components of a client coded link system, according to some example embodiments.
Figure 6B:
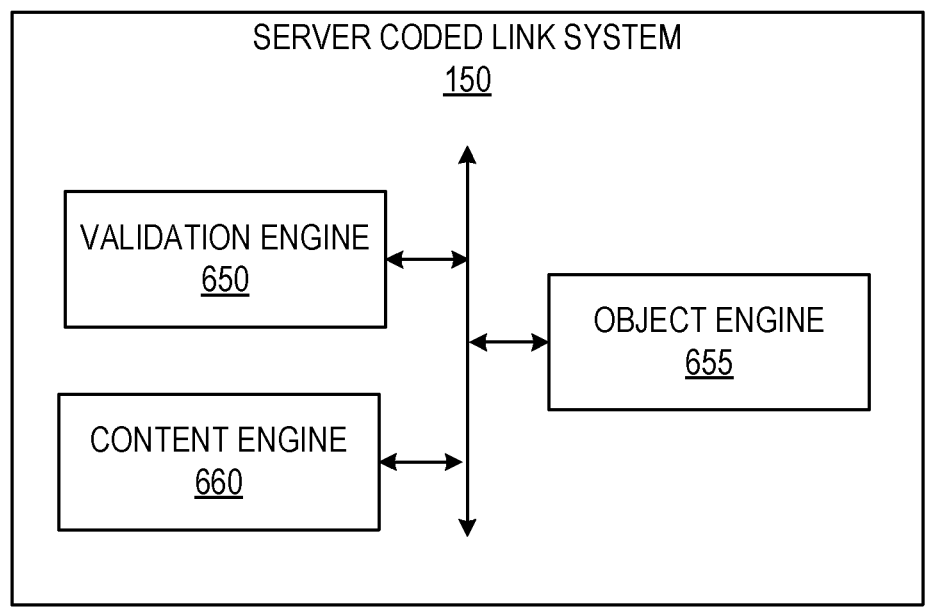
FIG. 6B shows example functional components of a server coded link system, according to some example embodiments.

FIGS. 6A and 6B illustrate various internal functional components of a client coded link system 210 and a server coded link system 150, according to some example embodiments. It is appreciated that the server side components are specially configured to handle requests issued from the client side components. For example, the client coded link system 210 can scan a scannable image, identify the code, and transmit the code to the server coded link system 150. The server coded linked system 150 is configured to receive the identifier, locate and access a data object that corresponds to the identifier, and send content back to the client coded link system 210. In some example embodiments, the content sent back to the client side comprises network addresses of one or more web pages linked to the scannable image, as discussed in further details below. It is further appreciated that the client side devices are configured to work with one another. For example, a first client device may use one or more engines of the client coded link system 210 to generate a scannable image and send the scannable image to a second client device. Further, the second client device may use one or more modules of the client coded link system 210 to receive the scannable image from the first user, and to contact the server for further processing, as discussed in further detail in FIG. 11.

FIG. 6A shows example functional components of a client coded link system 210, according to some example embodiments. The components themselves are communicatively coupled (e.g., via appropriate interfaces) to each other and to various data sources, so as to allow information to be passed between the applications or so as to allow the applications to share and access common data. Furthermore, the components access the database 126 via the database server 124. As illustrated, the client coded link system comprises an interface engine 605, a network image engine 610, a code engine 615, a transmission engine 620, a detection engine 625, an analytics engine 630, and a map engine 635. The interface engine 605 manages receiving user inputs (e.g., through a keyboard of a client device), displaying image data (e.g., live video feed) on a display of the client device, displaying augmented reality effects on the image data, and accessing and display of network addressable pages (e.g., webpages). The network image engine 610 manages receiving address data of the network addressable pages (e.g., URLs of webpages). The network image engine 610 is further configured to access the pages in the background using a hidden web viewer to retrieve images in the pages. The network image engine 610 is further configured to access and retrieve images stored locally on a client device, as discussed in further detail below. The code engine 615 is configured to generate a unique identifier for the scannable image. The code engine 615 is further configured to generate a code in the form of data marks (e.g., dots) for placement in the scannable image, as discussed in further detail below. The transmission engine 620 is configured to store the code, identifier, selected image, network addresses, and the scannable image locally on the client device, according to some example embodiments. Further, the transmission engine 620 is also configured to transfer the code, identifier, selected image, network addresses, and the scannable image to the server or other client devices. The detection engine 625 is configured to detect a scannable image being displayed within a live feed (e.g., live video feed) or a single image (e.g., a photograph). The analytics engine 630 is configured to pull, from a server, analysis data, such as scans or clicks of scannable images for presentation to the user on the client device. The map engine 635 is configured to pull, from a server, geographic location data of scans or clicks with scannable images for presentation by the user of the client device.

FIG. 6B shows example functional components of a server coded link system 150, according to some example embodiments. The components themselves are communicatively coupled (e.g., via appropriate interfaces) to each other and to various data sources, so as to allow information to be passed between the applications or so as to allow the applications to share and access common data. Furthermore, the components access the database 126 via the database server 124. As illustrated, the server coded link system 150 comprises a validation engine 650, an object engine 655, and a content engine 660. The validation engine 650 is configured to validate a code received from a client device by determining whether or not the code is associated with or identifies a data object. The object engine 655 is configured to generate data objects for a given scannable image. The data object stores address data, code data, and selected image data for the scannable image. The content engine 660 is configured to send additional data such as animation or other display effects (e.g., augmented reality elements, live feed effects) to the client device when the client device sends a code from a scannable image to the server. In this way, the scannable image can serve to unlock the content.

Figure 7:
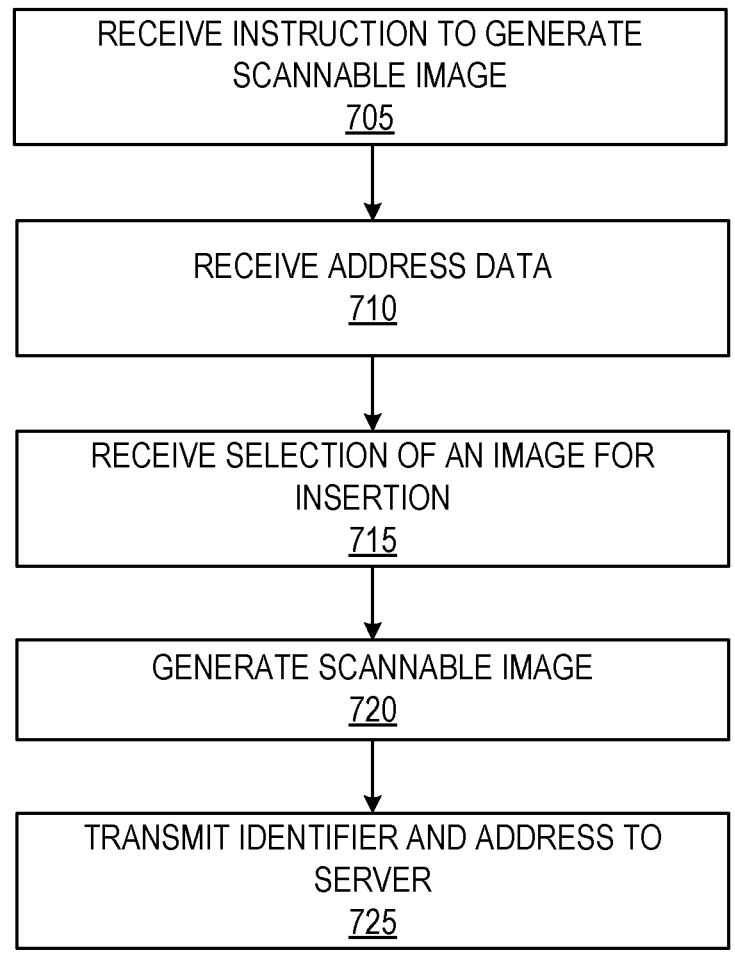
FIG. 7 shows a flow diagram of a method for generating a scannable image, according to some example embodiments.

FIG. 7 shows a flow diagram of a method 700 for generating a scannable image, according to some example embodiments. At operation 705, the interface engine 605 receives instruction to generate the scannable image. For example, the user uses a create scannable image button to initiate method 700. At operation 710, the network image engine 610 receives address data. The address data comprises network addresses of network addressable pages. For example, the address data can be one or more URLs for one or more webpages. At operation 715, the network image engine 610 receives selection of an image for integration. For example, responsive to receiving the address data, client coded link system 210 accesses the pages, retrieves images, and displays the images to the user through the client device 102. The user can then select one of the provided images for integration into the scannable image. At operation 720, the code engine 615 generates the scannable image. The scannable image may include the selected image integrated into a preconfigured area and further include data marks that encode an identifier. The data marks function as an optical bar code that can be decoded by the code engine 615 to produce a unique identifier. The identifier is unique in that it uniquely identifies a data object within the network 106 or database 126. At operation 725, the transmission engine 620 transmits the identifier of the scannable image and address data to a server (e.g., to application server 140 which hosts server coded link system 150), according to some example embodiments. The server can receive the identifier and address data and use it to create a data object. The data object is then stored within the network, e.g., within database 126, for later access by a user when the user scans the generated scannable image.

Figure 8:
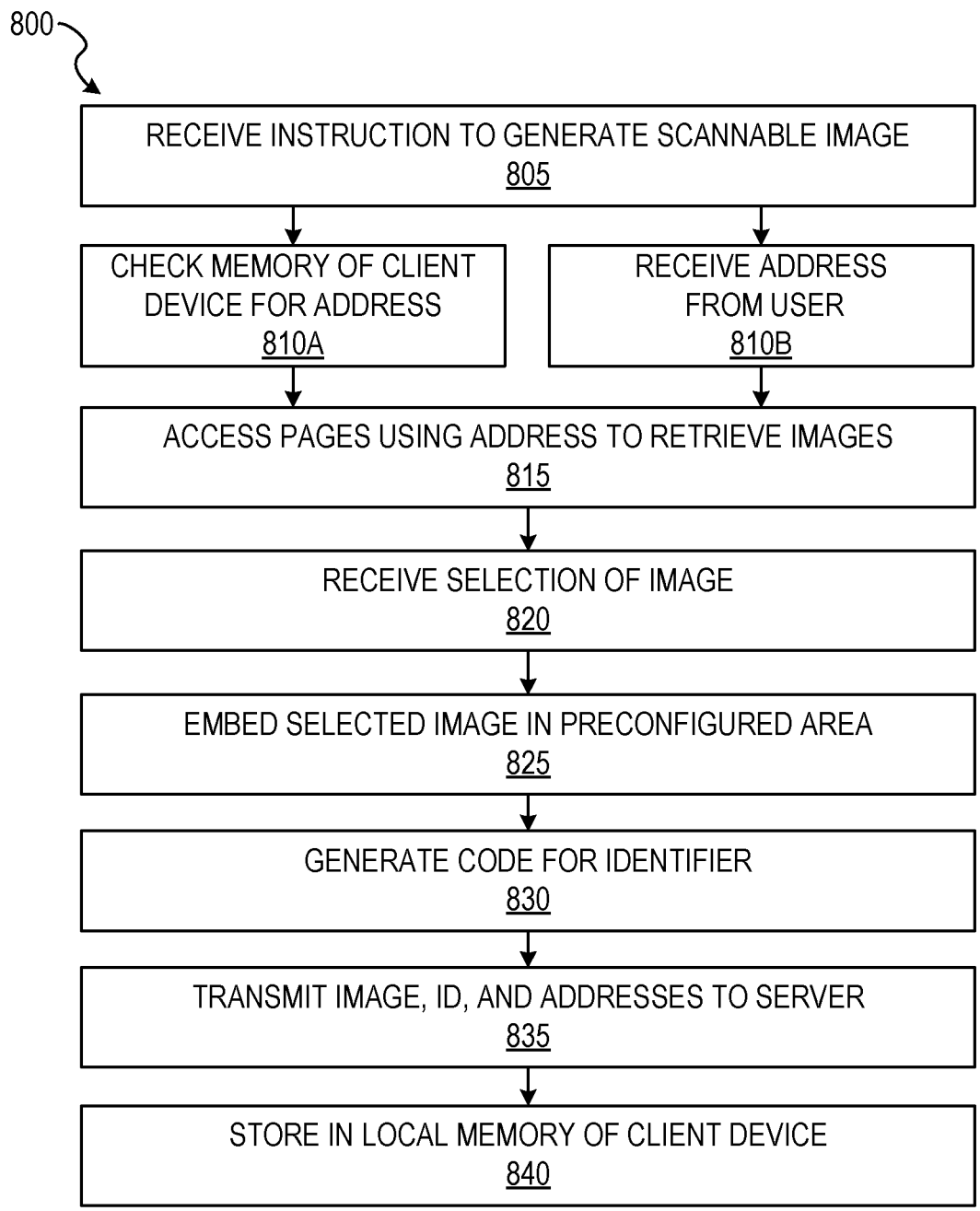
FIG. 8 shows a flow diagram of a method for using user selected addresses and images for generating a scannable image, according to some example embodiments.

FIG. 8 shows a flow diagram of a method 800 for using user selected addresses and images for generating a scannable image, according to some example embodiments. At operation 805, the interface engine 605 receives instruction to generate the scannable image. As a first option, at operation 810A, the network image engine 610 checks the memory of the client device for address data. For example, the interface engine 605 may access the clipboard (e.g., copy/paste memory for the client device 102) and determine whether there is address data stored on the clipboard. If there is address data on the clipboard, the interface engine may forward the data to network image engine 610 to retrieve images. As a second option, at operation 810B, the network image engine 610 receives address data directly from the user via an input/output (I/O) device of the client device. For example, the user may use an onscreen or physical keyboard to enter the address data.

At operation 815, the network image engine 610 accesses the network addressable pages using the address data to retrieve one or more images. For example, the network image engine 610 may access the pages addressed by the addresses and load JavaScript code into the page to check the DOM (Document Object Model) state of the page. In some example embodiments, the DOM state is checked every 0.3 seconds to update the state in the network image engine 610. Further, image tags can then be queried in the page and corresponding images can be returned to the client coded link system 210. In some example embodiments, the retrieved images are temporarily cached until they are transmitted to the server to be stored in a data object for the scannable image.

At operation 820, the network image engine 610 receives selection of an image for integration into the scannable image. At operation 825, the code engine 615 embeds the selected image into a preconfigured area of the scannable image. The preconfigured area may comprise a white space area in a prep-specified shape, such as a logo as discussed below. In alternative embodiments, the network image engine 610 automatically identifies an image among multiple images extracted from the pages. For example, the network image engine 610 identifies a particular image based on metadata associated with the image (e.g., an image associated with a title for the particular page that may be representative of the page). At operation 830, the code engine 615 generates an identifier for the scannable image. The identifier can be created using a unique identifier algorithm. According to some example embodiments, additionally at operation 830, the code engine 615 generates the data marks for integration into the scannable image. The identifier can then be used to create data marks that function as an optical bar code. When the data marks are displayed on the client device 102 (e.g., on a live feed, image, or screen), the detection engine scans the data marks and generates the identifier. At operation 835, the transmission engine 620 transmits the selected image, the identifier, and the user entered addresses to a server. At operation 840, the transmission engine 620 further stores the user selected image, the identifier, and the addresses as a data object in local memory of the client device. The data object may further be created and stored within a database 126 by the object engine 655, as discussed in further detail below.

Figure 9:
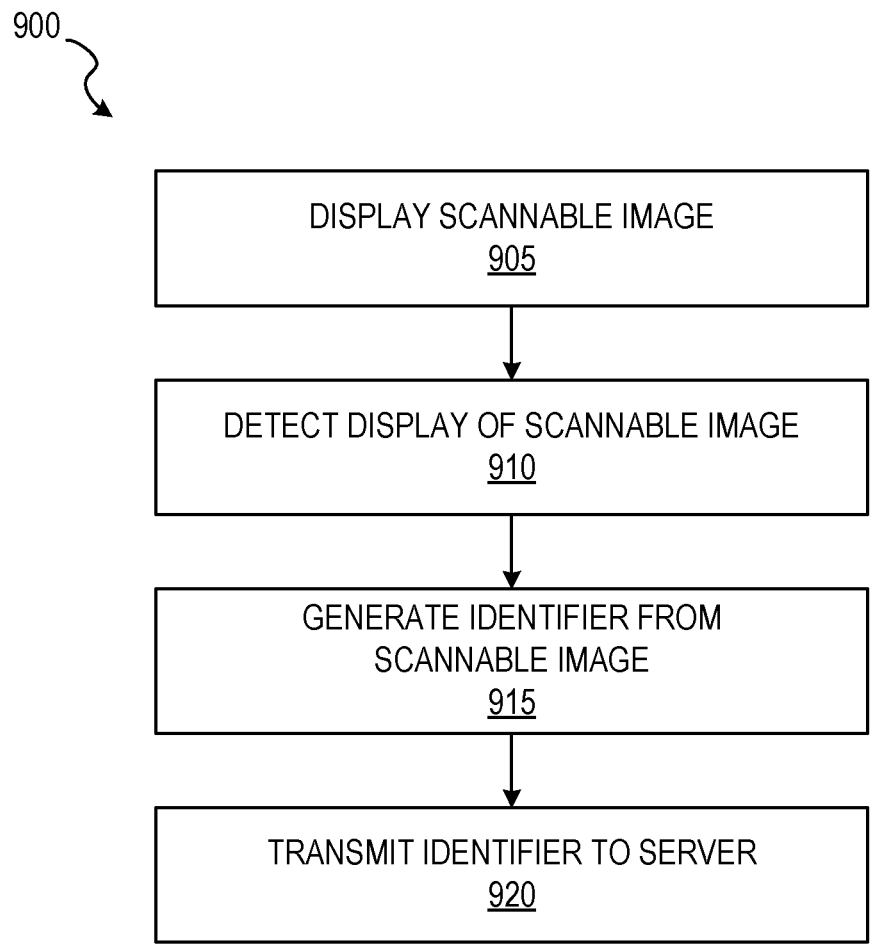
FIG. 9 shows a flow diagram of a method for processing a scannable image, according to some example embodiments.

FIG. 9 shows a flow diagram of a method 900 for processing a scannable image, according to some example embodiments. At operation 905, the interface engine 605 displays an extendable image on the display device of the client device. For example, a camera of the client device may be use to image a physical print of the scannable image. At operation 910, the detection engine 625 detects the display of the scannable image by scanning the display device for scannable images. For example, the detection engine monitors the live feed, analyzes a captured photograph, or passively monitors the display device of client device 110 to determine whether a scannable image is being displayed on the client device. At operation 915, the code engine 615 generates the identifier from the data marks in the detected scannable image. At operation 920, the transmission engine 620 transmits the generated identifier to the server.

Figure 10:
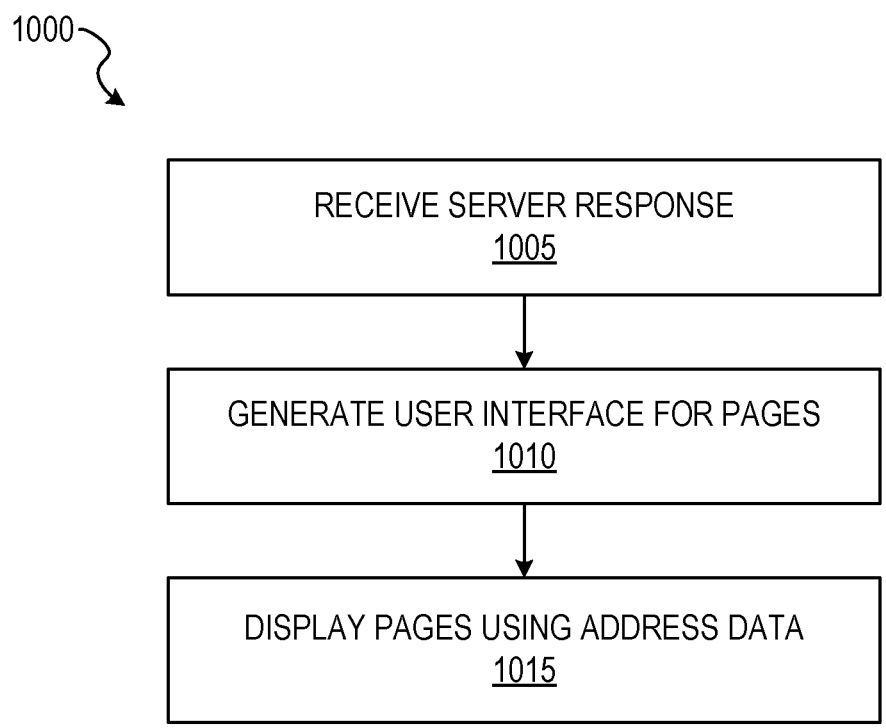
FIG. 10 shows a flow diagram of a method for processing content associated with the scannable image, according to some example embodiments.

FIG. 10 shows a flow diagram of a method 1000 for processing content associated with the scannable image, according to some example embodiments. At operation 1005, the interface engine 605 receives a response from the server. The response may include one or more address for pages to open on the client device. In some example embodiments, each scannable image is linked to one and only one webpage. In some example embodiments a scannable image is linked to multiple addresses, such that the client coded link system 210 will display multiple pages in response to scanning a single scannable image.

At operation 1010, the interface engine 605 generates a user interface menu to initiate the pages, as discussed in further detail below with reference to FIG. 12F. At operation 1015, in response to receiving a positive selection from the user interface menu, the interface engine 605 accesses the one or more pages over a network using the address data received from the server and displays the one or more pages on the client device (e.g., within a web viewer module integrated into messaging client application 104, or within web browser of client device 102).

Figure 11:
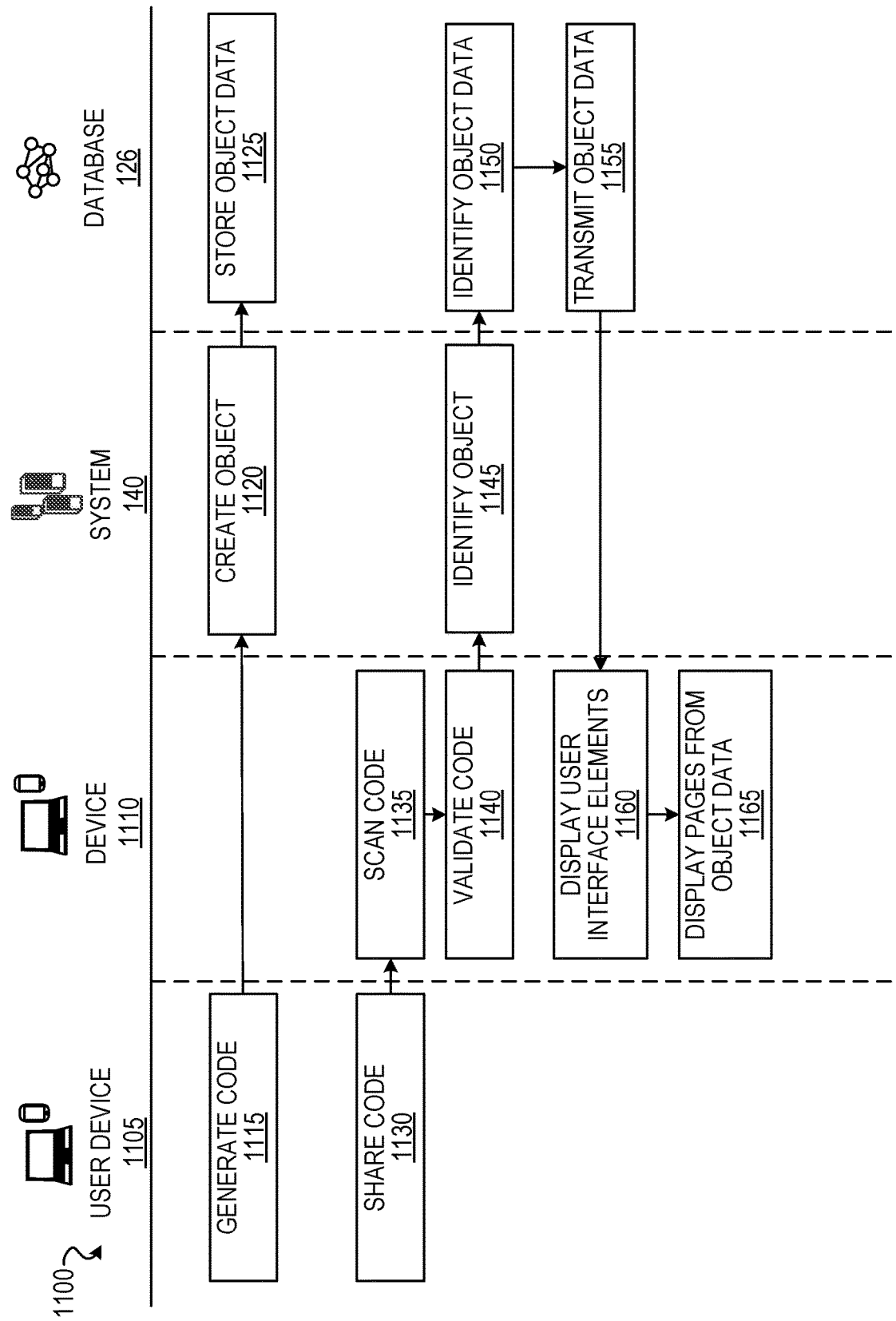
FIG. 11 shows an interaction diagram of network entities implementing custom visual codes for network links, according to some example embodiments.

FIG. 11 shows an interaction diagram 1100 of network entities implementing custom visual codes for network links, according to some example embodiments. At operation 1115, the user device 1105 generates a scannable image as explained above. The scannable image is then transmitted to the server 112 (e.g., to server coded link system 150). At operation 1120, the object engine 655 creates a data object for the scannable image. The server 140 then instructs the database 126 to store the data object, as illustrated operation 1125. The data object may include an image file of the scannable image with data marks and selected image integrated, the selected image in raw form (not integrated into the scannable image), the data marks in raw form, the one or more addresses of the pages, and additional actions specified by the user that created the scannable image.

At operation 1130, the user device 1105 shares the scannable image by transmitting the scannable image directly to a second client device of owned by different user (e.g., client device 1110). For example, the user of user device 1105 may send the scannable image to the client second client device 1110 as a text message (e.g. short message server (SMS) message). At operation 1135, the second client device 1110 uses the detection engine 625 to scan the scannable image received from user device 1105. For example, the user may use an instance of the client coded link system installed on client device 1110 to open, e.g., display, the received scannable image. At operation 1140, the detection engine 625 validates the scannable image to determine whether or not the scannable image code it generates has a valid identifier. For example, all identifiers generated by the code engine 615 may correspond to an equation or scheme such that a non-conforming identifier can be determined. If the identify is invalid, the second client device 1110 displays an error message to the user. Alternatively, upon the identifier being determined be valid, the second client device 1110 transmits the identifier to server 140.

At operation 1145, the object engine 655 uses the received identifier to identify a corresponding data object. In some example embodiments, the validation engine 650 first validates the identifier on the server side. Server side validation may be performed by checking whether the identifier of the received scannable images corresponds to (e.g., identifies) a stored data object on the server. If the identifier does not correspond to a stored data object, an error message is transmitted back to client device 1105.

Assuming the identifier identifies a stored data object on the server, the server 140 then uses the content engine 262 to retrieve the data object from the database 126 at operation 1150. At operation 1155, retrieved data is then sent back to the second client device 1110, e.g., via the application server 140. At operation 1160, the second client device 1110 receives the content from the application server and the database and displays user interface elements, such as a menu, as discussed in further detail below with reference to FIG. 12F. At operation 1165, the interface engine 605 uses the address data to access the network addressable pages and display them on the display device of the second client device 1110.

Figure 12A:
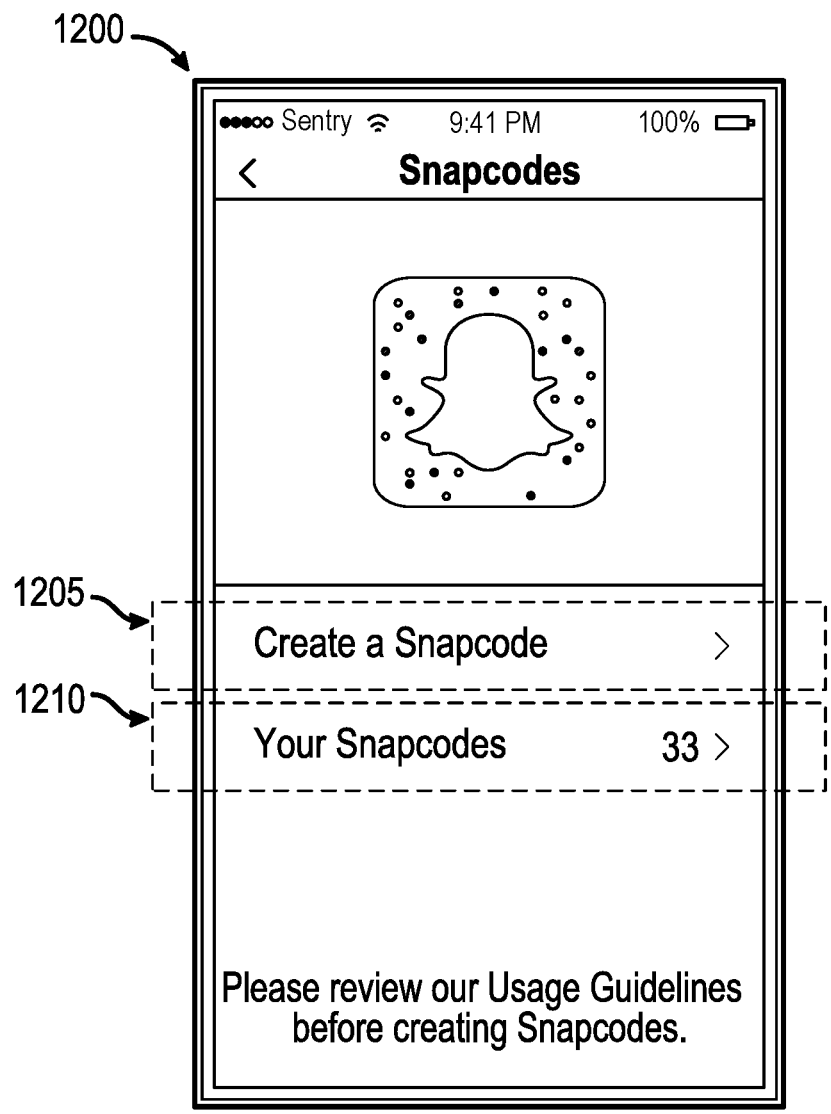
FIG. 12A show a user interface for receiving an instruction to generate a scannable image according to some example embodiments.

FIG. 12A show a user interface 1200 for receiving an instruction to generate a scannable image, according to some example embodiments. As illustrated in FIG. 12A, the user interface 1200 comprises two buttons. A create button 1205 is configured to generate an instruction to generate the scannable image. A snap code library button 1210 is configured to access a library or catalog of previously created scannable images locally stored (e.g., on client device 102)

Figure 12B:
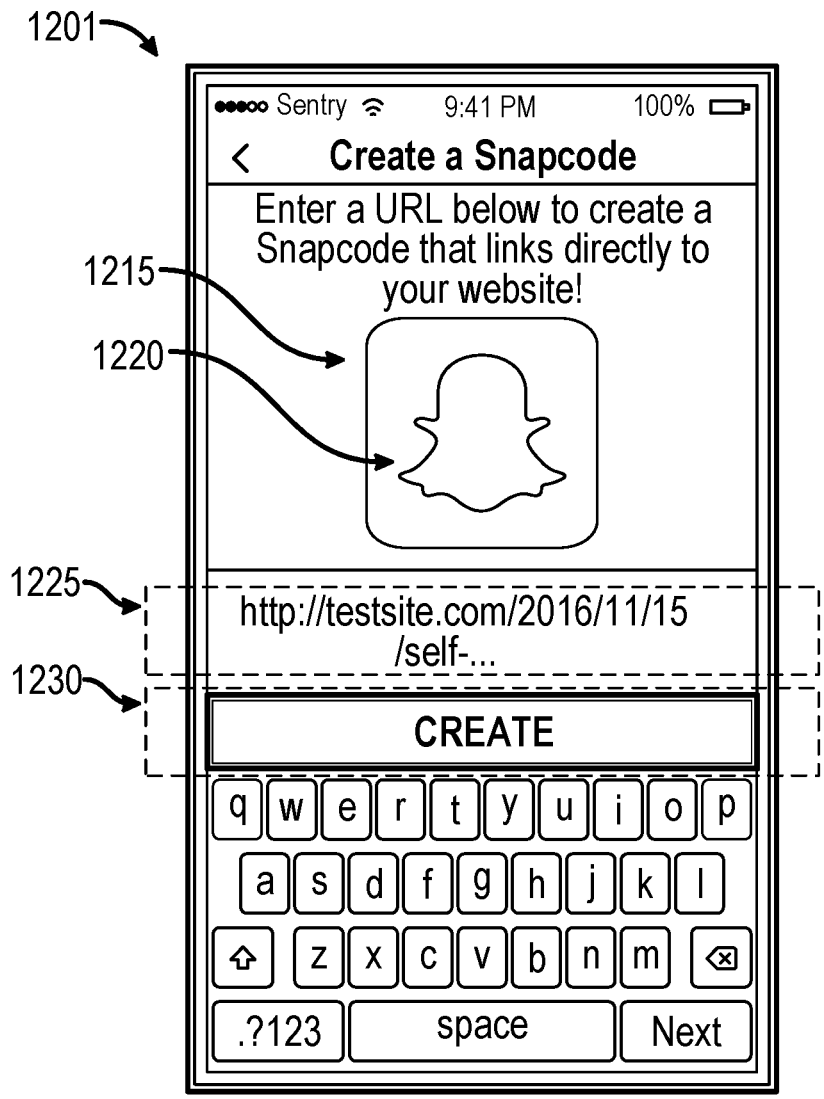
FIG. 12B shows a user interface for processing address data for a scannable image, according to some example embodiments.

FIG. 12B shows a user interface 1201 for processing address data for a scannable image, according to some example embodiments. As illustrated in user interface 1201, field 1225 is operable to receive address data from the user. According to some example embodiments, the network image engine 610 checks the clipboard of the client device to determine whether there is network address data saved on the clipboard. Alternatively, the user may use a keyboard to directly enter the address data into the field 1225. After the address data is entered into field 1225, the user may select the create button 1230, which is configured to cause the code engine 615 to generate an identifier and data marks that encode the identifier. Further illustrated is image area 1220, which is an area preconfigured within a scannable image 1215 to receive a user selected image for integration into the scannable image.

In some example embodiments, as soon as the network address is received (e.g., via input into field 1225 or by detection of an address on the clipboard), the network image engine 610 automatically retrieves an image from the page that corresponds to the network address. The retrieved image can be displayed within image area 1220 automatically or in later user interfaces, as discussed below. In some example embodiments, the automatically retrieved image is the largest image on the page that corresponds to the received address.

Figure 12C:
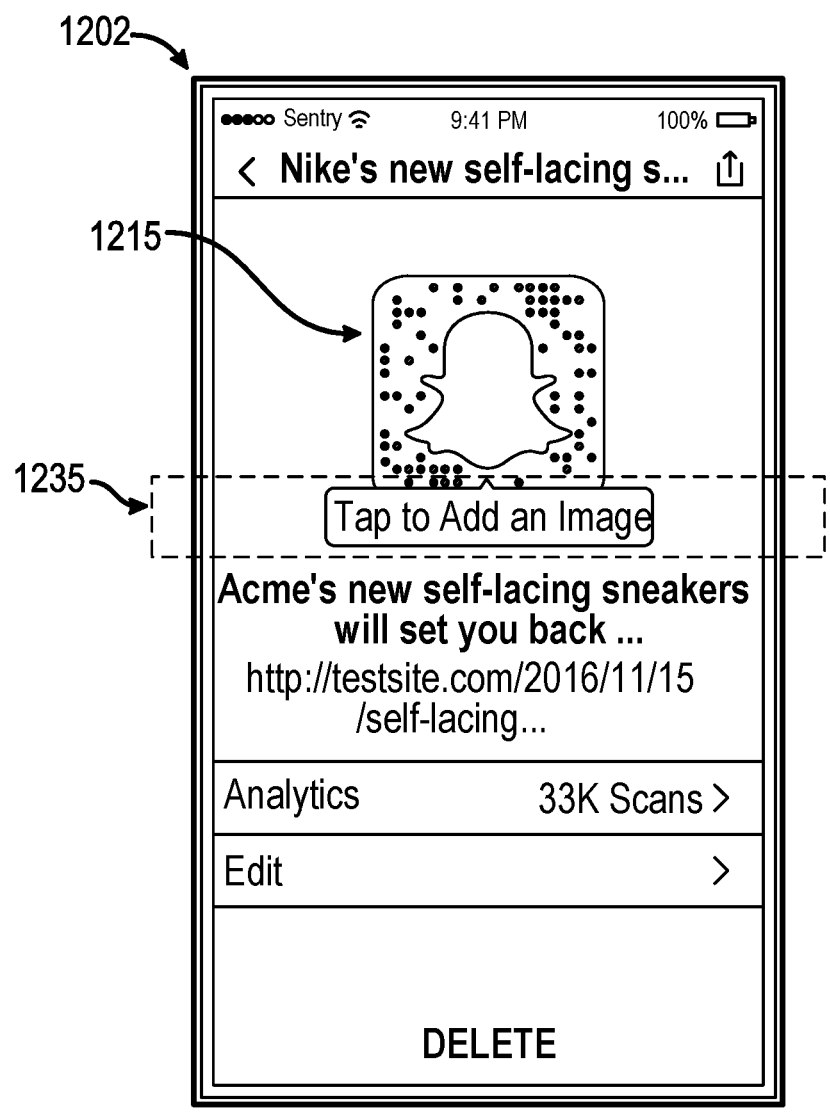
FIG. 12C shows a user interface for processing user selectable images for a scannable image, according to some example embodiments.

FIG. 12C shows a user interface 1202 for processing user selectable images for a scannable image, according to some example embodiments. As illustrated, the scannable image 1215 has the data marks (e.g., dots) that encode the network address into another preconfigured area of the scannable image (e.g., the area outside the ghost outline but inside the rounded square border of the scannable image).

Further details of scannable images are described in: U.S. Pat. No. 9,111,164, titled "CUSTOM FUNCTIONAL PATTERNS FOR OPTICAL BARCODES," filed on Jan. 19, 2015; and application Ser. No. 14/595,712, titled "GUIDED PERSONAL IDENTITY BASED ACTIONS," filed on Jan. 13, 2015, which are hereby incorporated by reference in entirety.

FIG. 12C further illustrates an add image button 1235. The add image button 1235 is configured to launch a hidden web viewer that accesses webpages to identify user images for selection and integration (e.g., insertion, overlay) onto the scannable image. As discussed, in some example embodiments, an image is automatically retrieved from the page upon identifying or otherwise receiving the network address as discussed above.

Figure 12D:
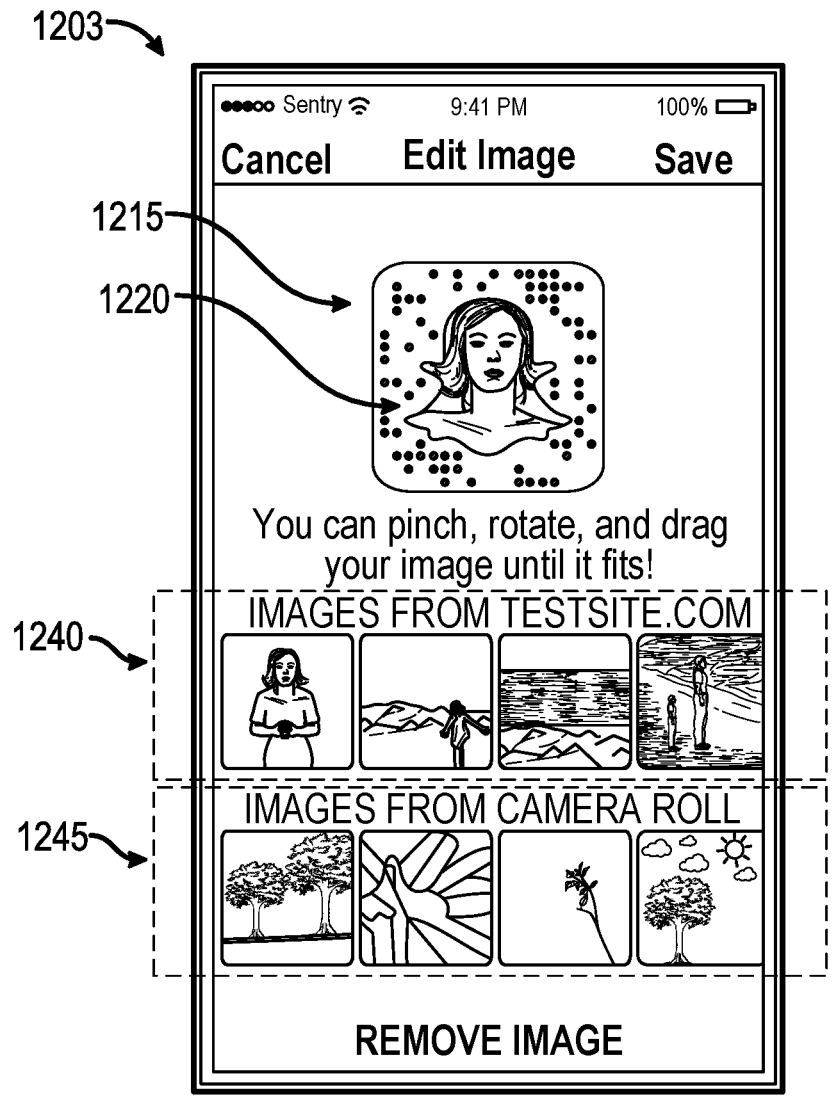
FIG. 12D shows a user interface for selecting one or more of the user selectable images for a scannable image, according to some example embodiments.

FIG. 12D shows a user interface 1203 for selecting one or more of the user selectable images for a scannable image, according to some example embodiments. Responsive to the user selecting the add image button 1235, the network image engine 610 launches a hidden web viewer which accesses the webpages that correspond to the address data. The webpages may display one or more images identified by their various extensions such as .PNG or .JPG. Further, the images may be identified using the DOM to query image tags. The network image engine 610 then retrieves the images and displays them within a carousel 1240. The user may browse the retrieved images using the carousel 1240 by swiping left or right on the carousel to display different images. The user may select one of the images by dragging the image onto the scannable image 1215.

In the example of FIG. 12D, the user has dragged the first image from carousel 1240 to the scannable image 1215. Responsive to this user action, the code engine 250 has integrated the selected image by inserting the selected image into the preconfigured area within the scannable image. The user can further manipulate the selected image by using different gesture commands such as pinch-and-rotate and others, as is known to those having ordinary skill in the art.

Further, according to some example embodiments, the network image engine 610 auto-selects an image from the retrieved images for integration into the scannable image based on metadata of the page, the address, or the selected image. For example, if the network addressable page is a web page article about a pop singer, and the title of page and the image title both include the pop singer's name, the image may be auto-selected by the network image engine 610 and integrated into the scannable image. In those example embodiments, the carousel may not be displayed. Instead, after the address data is identified (e.g., entered into field 1225 or found on the clipboard) image retrieval, selection, and integration into the scannable image occur automatically. In this way, the user can quickly create custom visual codes that indicate the type of content (e.g., page) linked to the visual code. Other types of metadata or features of the images may be used for automatic selection, according to some example embodiments. For example, the largest image (e.g., largest pixel size) may be considered the primary image for the article, and the network image engine 610 auto-selects the largest image for integration into the scannable code.

Additionally, according to some example embodiments, a second carousel 1245 displays images from a camera role of the client device. The images in the second carousel 1245 are images that were captured using the client device camera and stored locally within a gallery of the client device. In this way, the user can create customized network links using images from network pages or images from his or her local device.

Figure 12E:
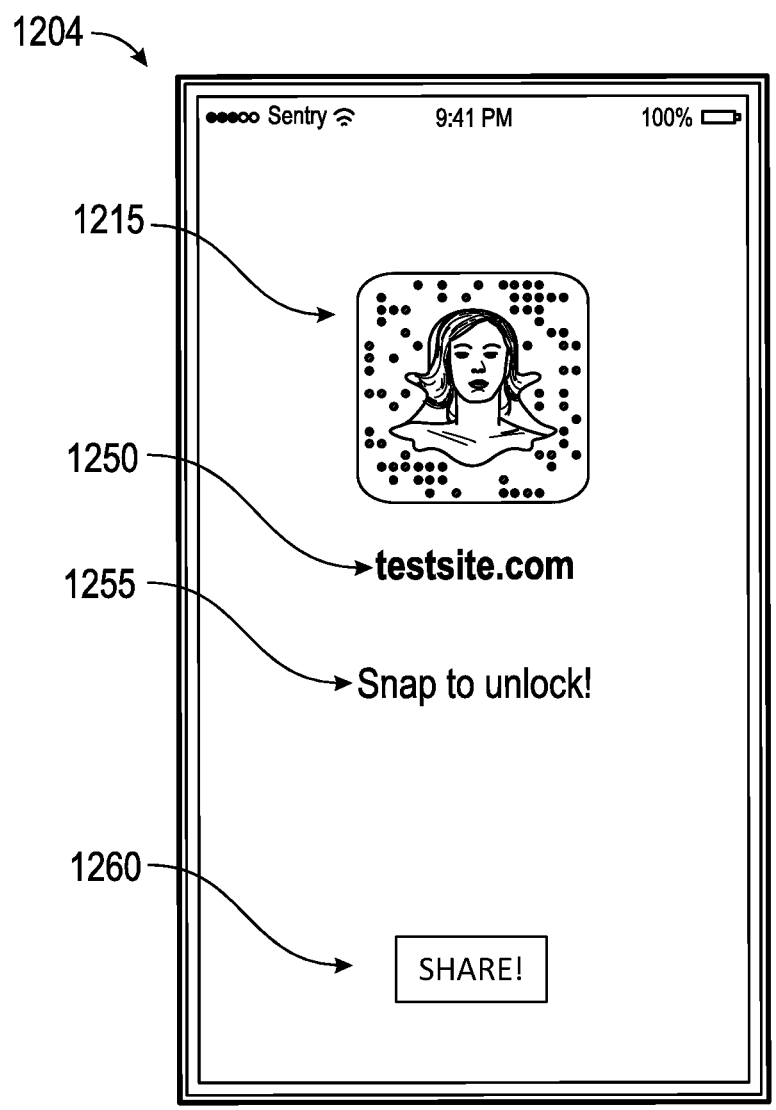
FIG. 12E shows a user interface for viewing the generated scannable image, according to some example embodiments.

FIG. 12E shows a user interface 1204 for viewing the generated scannable image, according to some example embodiments. As illustrated in user interface 1204, the complete scannable image 1215 is displayed in the center area of the user interface 1204. Further, according to some example embodiments, network address data 1250 is displayed below the scannable image 1215 to indicate what the scannable image links to. Further, an instruction 1255 informs a user on how to access or use the scannable image 1215. Further still, a share button 1260 allows a user to transmit the scannable image to other client devices through various means, such as an e-mail or text message (SMS message), or as a post on social media platforms.

Figure 12F:
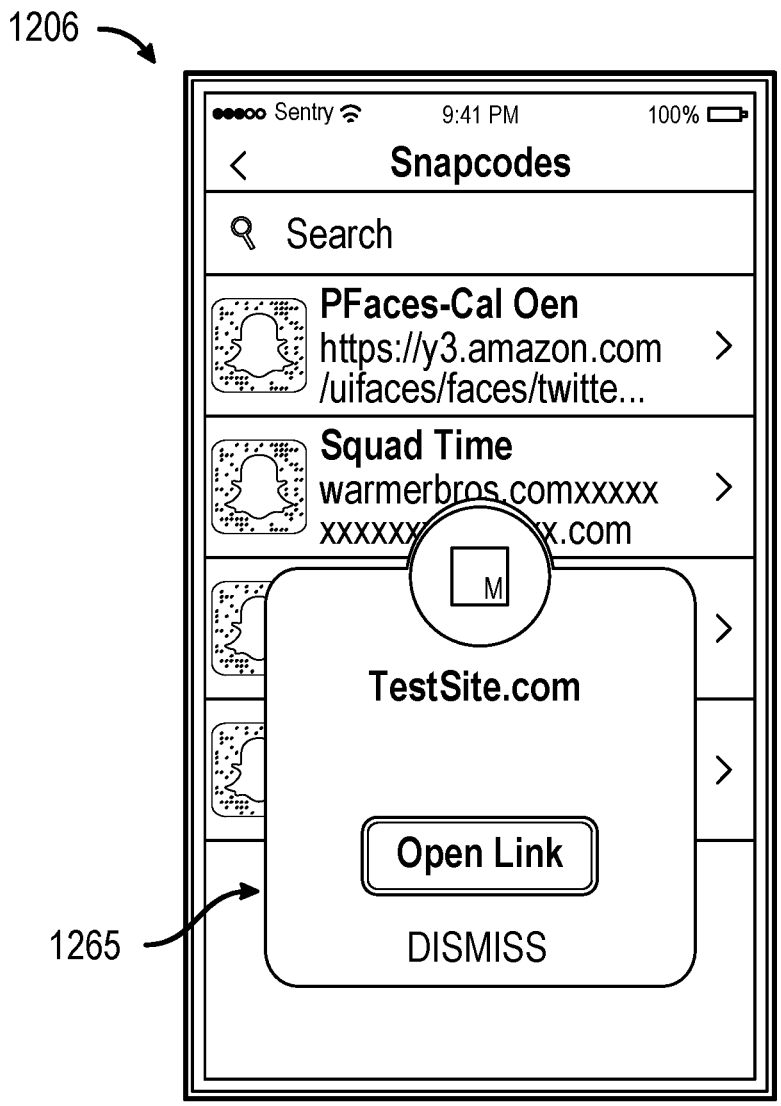
FIG. 12F shows a user interface for displaying a link menu, according to some example embodiments.

FIG. 12F shows a user interface 1206 for displaying a link menu, according to some example embodiments. When a user scans the scannable image 1215, the interface engine 605 generates a user interface menu 1265, which informs the user that the scannable image is operable to open one or more network pages. For example, as illustrated, the user interface menu 1265 comprises two buttons: a first "Open Link" button configured to initiate the accessing and displaying of the network pages, and a second "Dismiss" button configured to ignore the pages and not open them. In this way, the user is given the option to avoid opening pages (e.g., if the user does not trust the URL of the pages or like the image displayed within the preconfigured area).

Figure 13:
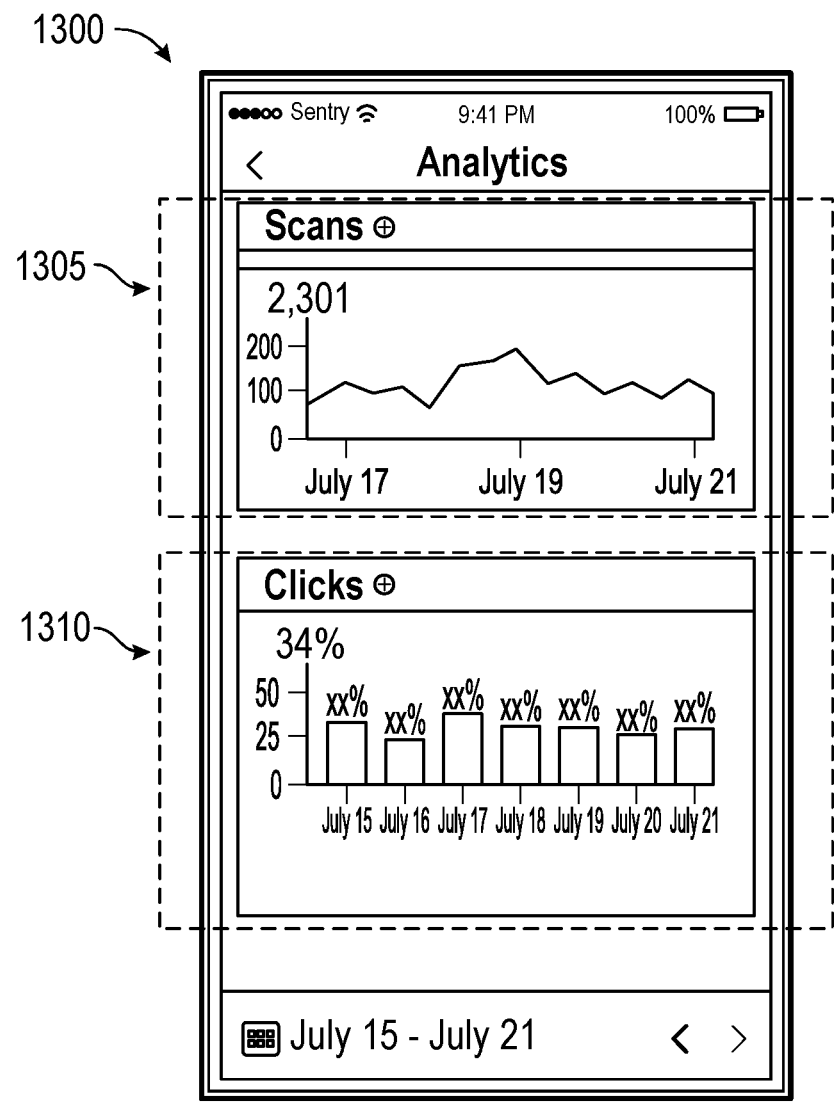
FIG. 13 shows a user interface for processing interaction data of interactions with one or more scannable images, according to some example embodiments.

FIG. 13 shows a user interface 1300 for processing interaction data of interactions with one or more scannable images, according to some example embodiments. In some example embodiments, every time a user scans a scannable image or clicks "Open Link," the object data 255 stores the scan or click as an interaction event. All interaction events can be queried from client devices for presentation to the user. For example, as illustrated, scanned area 1305 displays how many users have scanned the codes generated by a given user. Further, a clicks analysis area 1310 displays how many users decided to access and display network pages linked to the scanned scannable images.

Figure 14:
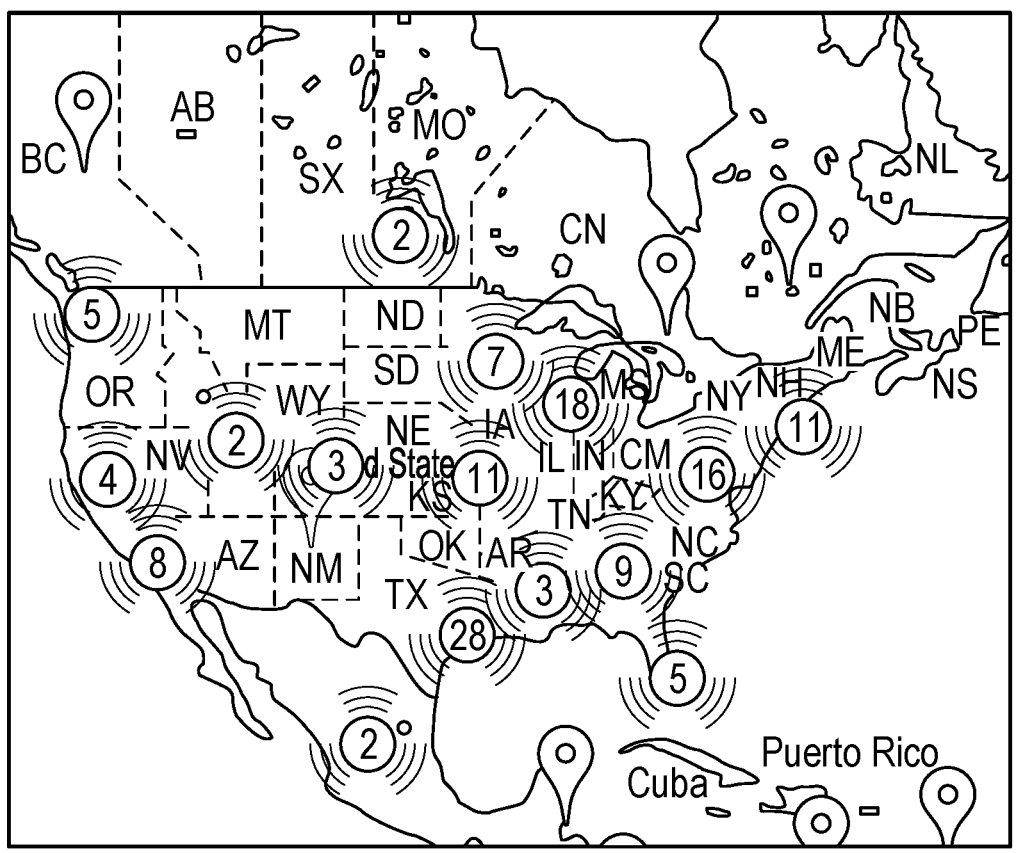
FIG. 14 shows a user interface for mapping interaction data of interactions with one or more scannable images, according to some example embodiments.

FIG. 14 shows a user interface 1400 for mapping interaction data of interactions with one or more scannable images, according to some example embodiments. When a code is scanned or "Open Link" is selected, the geographic coordinates of the location in which the client device scanned the scannable image is sent from the client device to the server for later analysis and mapping by the client devices or admins using the application server 140. For example, as illustrated, user interface 1400 shows a map of the United States with different thumbnails in different geographic locations. Each of the thumbnails corresponds to an interaction event (e.g., a scan of a scannable image which the user has distributed in print form across the United States). In some example embodiments, the map engine 635 will only show a thumbnail if a minimum number of scans of a given scannable image has occurred. Further, according to some example embodiments, the map engine 635 obfuscates the exact location of the interaction event. That is, for example, instead of showing the street intersection at which an interaction event occurred, the map engine 635 simply places the thumbnail in the center of the city in which the scan event occurred.

Figure 15:
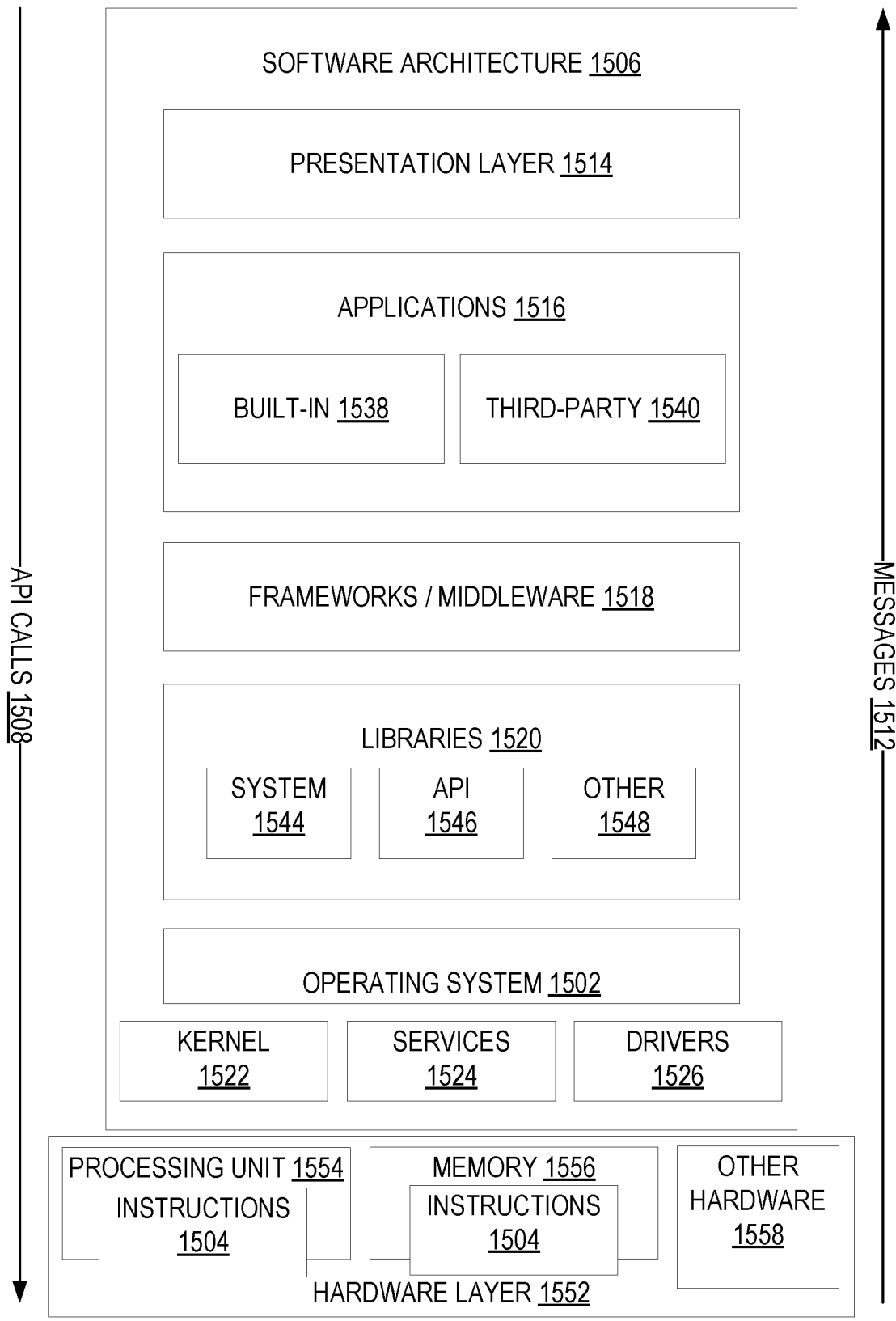
FIG. 15 is a block diagram illustrating a representative software architecture, which may be used in conjunction with various hardware architectures herein described.

FIG. 15 is a block diagram illustrating an example software architecture 1506, which may be used in conjunction with various hardware architectures herein described. FIG. 15 is a non-limiting example of a software architecture, and it will be appreciated that many other architectures may be implemented to facilitate the functionality described herein. The software architecture 1506 may execute on hardware such as a machine 1600 of FIG. 16 that includes, among other things, processors, memory, and I/O components. A representative hardware layer 1552 is illustrated and can represent, for example, the machine 1600 of FIG. 16. The representative hardware layer 1552 includes a processing unit 1554 having associated executable instructions 1504. The executable instructions 1504 represent the executable instructions of the software architecture 1506, including implementation of the methods, components, and so forth described herein. The hardware layer 1552 also includes a memory/storage 1556, which also has the executable instructions 1504. The hardware layer 1552 may also comprise other hardware 1558.

In the example architecture of FIG. 15, the software architecture 1506 may be conceptualized as a stack of layers where each layer provides particular functionality. For example, the software architecture 1506 may include layers such as an operating system 1502, libraries 1520, frameworks/middleware 1518, applications 1516, and a presentation layer 1514. Operationally, the applications 1516 and/or other components within the layers may invoke API calls 1508 through the software stack and receive a response in the form of messages 1512. The layers illustrated are representative in nature and not all software architectures have all layers. For example, some mobile or special-purpose operating systems may not provide a frameworks/middleware 1518, while others may provide such a layer. Other software architectures may include additional or different layers.

The operating system 1502 may manage hardware resources and provide common services. The operating system 1502 may include, for example, a kernel 1522, services 1524, and drivers 1526. The kernel 1522 may act as an abstraction layer between the hardware and the other software layers. For example, the kernel 1522 may be responsible for memory management, processor management (e.g., scheduling), component management, networking, security settings, and so on. The services 1524 may provide other common services for the other software layers. The drivers 1526 are responsible for controlling or interfacing with the underlying hardware. For instance, the drivers 1526 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1520 provide a common infrastructure that is used by the applications 1516 and/or other components and/or layers. The libraries 1520 provide functionality that allows other software components to perform tasks in an easier fashion than by interfacing directly with the underlying operating system 1502 functionality (e.g., kernel 1522, services 1524, and/or drivers 1526). The libraries 1520 may include system libraries 1544 (e.g., C standard library) that may provide functions such as memory allocation functions, string manipulation functions, mathematical functions, and the like. In addition, the libraries 1520 may include API libraries 1546 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1520 may also include a wide variety of other libraries 1548 to provide many other APIs to the applications 1516 and other software components/modules.

The frameworks/middleware 1518 provide a higher-level common infrastructure that may be used by the applications 1516 and/or other software components/modules. For example, the frameworks/middleware 1518 may provide various graphic user interface (GUI) functions, high-level resource management, high-level location services, and so forth. The frameworks/middleware 1518 may provide a broad spectrum of other APIs that may be utilized by the applications 1516 and/or other software components/modules, some of which may be specific to a particular operating system 1502 or platform.

The applications 1516 include built-in applications 1538 and/or third-party applications 1540. Examples of representative built-in applications 1538 may include, but are not limited to, a contacts application, a browser application, a book reader application, a location application, a media application, a messaging application, and/or a game application. The third-party applications 1540 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1540 may invoke the API calls 1508 provided by the mobile operating system (such as the operating system 1502) to facilitate functionality described herein.

The applications 1516 may use built-in operating system functions (e.g., kernel 1522, services 1524, and/or drivers 1526), libraries 1520, and frameworks/middleware 1518 to create user interfaces to interact with users of the system. Alternatively, or additionally, in some systems, interactions with a user may occur through a presentation layer, such as the presentation layer 1514. In these systems, the application/component "logic" can be separated from the aspects of the application/component that interact with a user.

Figure 16:
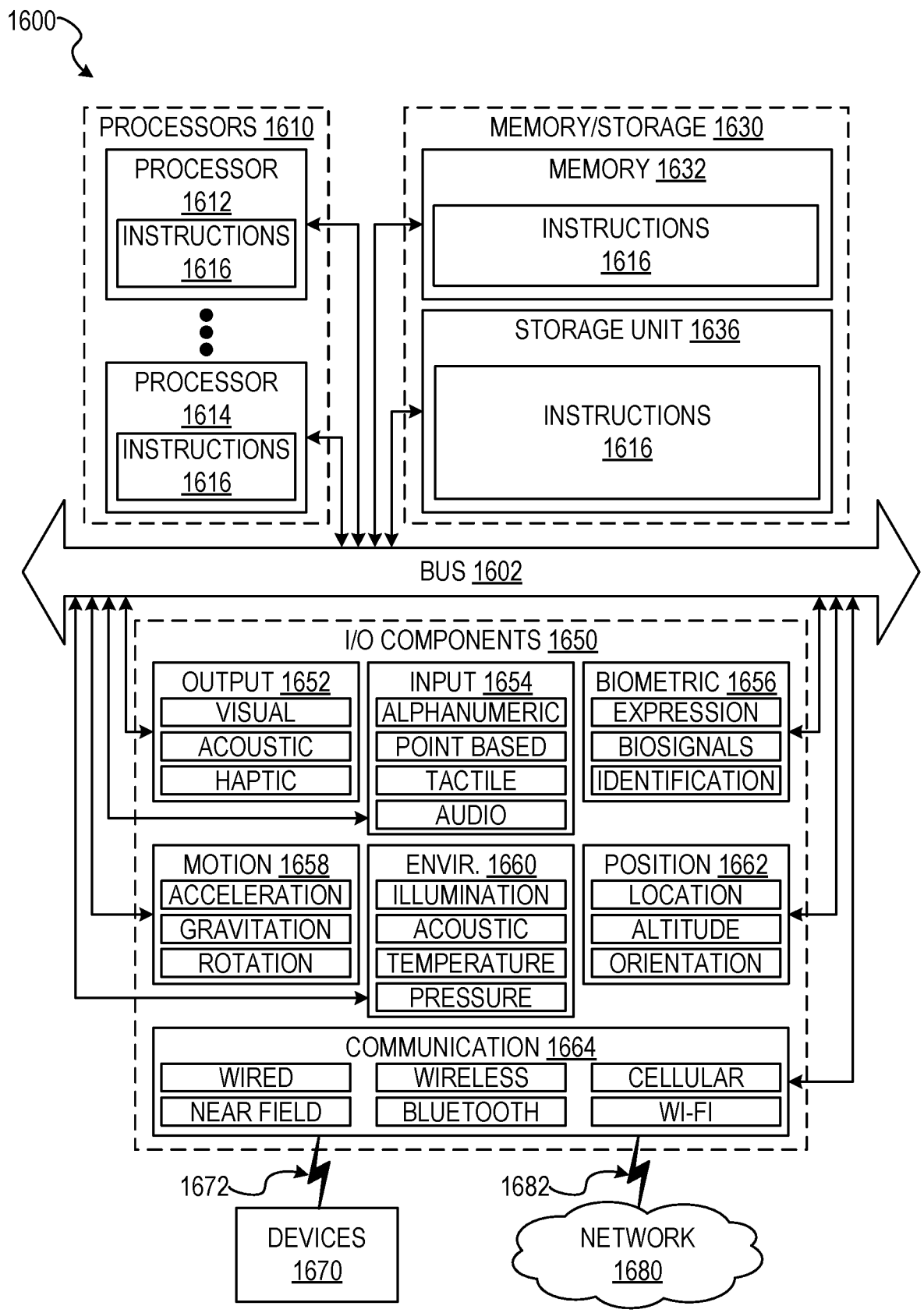
FIG. 16 is a block diagram illustrating components of a machine, according to some example embodiments, able to read instructions from a machine-readable medium (e.g., a machine-readable storage medium) and perform any one or more of the methodologies discussed herein.

FIG. 16 is a block diagram illustrating components of a machine 1600, according to some example embodiments, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein may be executed. As such, the instructions 1616 may be used to implement modules or components described herein. The instructions 1616 transform the general, non-programmed machine 1600 into a particular machine 1600 programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1616, sequentially or otherwise, that specify actions to be taken by the machine 1600. Further, while only a single machine 1600 is illustrated, the term "machine" shall also be taken to include a collection of machines that individually or jointly execute the instructions 1616 to perform any one or more of the methodologies discussed herein.

The machine 1600 may include processors 1610, memory/storage 1630, and I/O components 1650, which may be configured to communicate with each other such as via a bus 1602. The memory/storage 1630 may include a memory 1632, such as a main memory, or other memory storage, and a storage unit 1636, both accessible to the processors 1610 such as via the bus 1602. The storage unit 1636 and memory 1632 store the instructions 1616 embodying any one or more of the methodologies or functions described herein. The instructions 1616 may also reside, completely or partially, within the memory 1632, within the storage unit 1636, within at least one of the processors 1610 (e.g., within the processor cache memory accessible to processor units 1612 or 1614), or any suitable combination thereof, during execution thereof by the machine 1600. Accordingly, the memory 1632, the storage unit 1636, and the memory of the processors 1610 are examples of machine-readable media.

The I/O components 1650 may include a wide variety of components to receive input, provide output, produce output, transmit information, exchange information, capture measurements, and so on. The specific I/O components 1650 that are included in a particular machine 1600 will depend on the type of machine. For example, portable machines such as mobile phones will likely include a touch input device or other such input mechanisms, while a headless server machine will likely not include such a touch input device. It will be appreciated that the I/O components 1650 may include many other components that are not shown in FIG. 16. The I/O components 1650 are grouped according to functionality merely for simplifying the following discussion and the grouping is in no way limiting. In various example embodiments, the I/O components 1650 may include output components 1652 and input components 1654. The output components 1652 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1650 may include biometric components 1656, motion components 1658, environment components 1660, or position components 1662 among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1658 may include acceleration sensor components (e.g., accelerometer), gravitation sensor components, rotation sensor components (e.g., gyroscope), and so forth. The environment components 1660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1662 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1650 may include communication components 1664 operable to couple the machine 1600 to a network 1680 or devices 1670 via a coupling 1682 and a coupling 1672, respectively. For example, the communication components 1664 may include a network interface component or other suitable device to interface with the network 1680. In further examples, the communication components 1664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1670 may be another machine or any of a wide variety of peripheral devices (e.g., a peripheral device coupled via a USB).

Moreover, the communication components 1664 may detect identifiers or include components operable to detect identifiers. For example, the communication components 1664 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1664, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions 1616 for execution by the machine 1600, and includes digital or analog communications signals or other intangible media to facilitate communication of such instructions 1616. Instructions 1616 may be transmitted or received over the network 1680 using a transmission medium via a network interface device and using any one of a number of well-known transfer protocols.

"CLIENT DEVICE" in this context refers to any machine 1600 that interfaces to a communications network 1680 to obtain resources from one or more server systems or other client devices 102. A client device 102 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1680.

"COMMUNICATIONS NETWORK" in this context refers to one or more portions of a network 1680 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1680 may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EPHEMERAL MESSAGE" in this context refers to a message 400 that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message 400 is transitory.

"MACHINE-READABLE MEDIUM" in this context refers to a component, a device, or other tangible media able to store instructions 1616 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1616. The term "machine-readable medium" shall also be taken to include any medium, or combination of multiple media, that is capable of storing instructions 1616 (e.g., code) for execution by a machine 1600, such that the instructions 1616, when executed by one or more processors 1610 of the machine 1600, cause the machine 1600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 1612 or a group of processors 1610) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1600) uniquely tailored to perform the configured functions and are no longer general-purpose processors 1610. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1612 configured by software to become a special-purpose processor, the general-purpose processor 1612 may be configured as respectively different special-purpose processors (e.g., comprising different hardware components) at different times. Software accordingly configures a particular processor 1612 or processors 1610, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1610 that are temporarily configured (e.g., by software) or permanently configured to perform the relevant operations. Whether temporarily or permanently configured, such processors 1610 may constitute processor-implemented components that operate to perform one or more operations or functions described herein. As used herein, "processor-implemented component" refers to a hardware component implemented using one or more processors 1610. Similarly, the methods described herein may be at least partially processor-implemented, with a particular processor 1612 or processors 1610 being an example of hardware. For example, at least some of the operations of a method may be performed by one or more processors 1610 or processor-implemented components. Moreover, the one or more processors 1610 may also operate to support performance of the relevant operations in a "cloud computing" environment or as a "software as a service" (SaaS). For example, at least some of the operations may be performed by a group of computers (as examples of machines 1600 including processors 1610), with these operations being accessible via a network 1680 (e.g., the Internet) and via one or more appropriate interfaces (e.g., an API). The performance of certain of the operations may be distributed among the processors 1610, not only residing within a single machine 1600, but deployed across a number of machines 1600. In some example embodiments, the processors 1610 or processor-implemented components may be located in a single geographic location (e.g., within a home environment, an office environment, or a server farm). In other example embodiments, the processors 1610 or processor-implemented components may be distributed across a number of geographic locations.

"PROCESSOR" in this context refers to any circuit or virtual circuit (a physical circuit emulated by logic executing on an actual processor 1612) that manipulates data values according to control signals (e.g., "commands," "op codes," "machine code," etc.) and which produces corresponding output signals that are applied to operate a machine 1600. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1610 may further be a multi-core processor 1610 having two or more independent processors 1612, 1614 (sometimes referred to as "cores") that may execute instructions 1616 contemporaneously.

"TIMESTAMP" in this context refers to a sequence of characters or encoded information identifying when a certain event occurred, for example giving date and time of day, sometimes accurate to a small fraction of a second.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, SNAP INC., All Rights Reserved.

What is claimed is:

1. A method, executed by one or more processors, comprising:
   receiving, on a client device, an instruction to generate a visual code that can be scanned by an optical sensor of a computing device to cause the computing device to retrieve and display a network addressable webpage, the instruction including a uniform resource locator identifying the network addressable webpage;
   accessing a first group of images that is posted publicly on the network addressable webpage, the first group of images having been retrieved using the uniform resource locator;
   accessing a second group of images stored in local memory of the client device, the second group of images not being posted publicly on the network addressable webpage;
   displaying, on the client device, the first group of images in a first display area and the second group of images in a second display area;
   receiving, on the client device, selection of a first image from either the first group of images or the second group of images to integrate with the visual code;
   generating the visual code, the visual code depicting data marks that encode an identifier for accessing the uniform resource locator, the visual code further depicting the first image that was selected to integrate with the visual code; and
   transmitting, to a server, the identifier and the uniform resource locator for the network addressable webpage.

2. The method of claim 1 further comprising:
   displaying the selected first image in a preconfigured area within the visual code; and
   receiving user input to manipulate the selected first image.

3. The method of claim 2 wherein the user input is in the form of a gesture command.

4. The method of claim 1 wherein the first display area is a first carousel and the second display area is a second carousel, the first and second carousels displaying further images on receipt of swipe gesture inputs.

5. The method of claim 1 wherein the first display area is a first horizontal carousel and the second display area is a second horizontal carousel located adjacent to the first horizontal carousel.

6. The method of claim 1, wherein the network addressable webpage is accessed using a hidden viewer that does not display the network addressable webpage as it is accessed.

7. The method of claim 1 further comprising:
   automatically selecting, from the first group of images from the network addressable webpage, a largest image for initial inclusion in the visual code, the largest image being a largest in size of the first group of images.

8. The method of claim 1, further comprising:
   displaying the visual code on a display device of the client device;
   scanning the display device to detect that the visual code is being displayed;
   generating an identifier using the data marks in the visual code; and
   transmitting the identifier to a server.

9. The method of claim 8, further comprising:
   receiving, from the server, a response comprising address data for the network addressable webpage; and
   responsive to receiving the response, displaying the network addressable webpage on the display device of the client device.

10. The method of claim 1 wherein the second group of images is accessed from a camera roll in the client device.

11. The method of claim 1, further comprising:
    receiving a network address of the network addressable webpage from a user using an input device on the client device.

12. The method of claim 11, wherein the network address comprises a uniform resource of the network addressable webpage.

13. The method of claim 1, wherein the network addressable webpage is accessed using address data stored in the client device.

14. A system comprising:
    one or more processors of a machine;
    a display device; and
    a memory storing instructions that, when executed by the one or more processors, cause the machine to perform operations comprising:
    receiving an instruction to generate a visual code that can be scanned by an optical sensor of a computing device to cause the computing device to retrieve and display a network addressable webpage, the instruction including a uniform resource locator identifying the network addressable webpage;
    accessing a first group of images that is posted publicly on the network addressable webpage, the first group of images having been retrieved using the uniform resource locator;
    accessing a second group of images stored in local memory of the system, the second group of images not being posted publicly on the network addressable webpage;
    displaying, on the display device, the first group of images in a first display area and the second group of images in a second display area;
    receiving a selection of a first image from either the first group of images or the second group of images to integrate with the visual code;
    generating the visual code, the visual code depicting data marks that encode an identifier for accessing the uniform resource locator, the visual code further depicting the first image that was selected to integrate with the visual code; and
    transmitting, to a server, the identifier and the uniform resource locator for the network addressable webpage.

15. The system of claim 14 wherein the operations further comprise:
    displaying the selected first image in a preconfigured area within the visual code; and
    receiving user input to manipulate the selected first image.

16. The system of claim 15 wherein the user input is in the form of a gesture command.

17. The system of claim 14 wherein the first display area is a first carousel and the second display area is a second carousel, the first and second carousels displaying further images on receipt of swipe gesture inputs.

18. The system of claim 14, further comprising:
    displaying the visual code on the display device of the system;
    scanning the display device to detect that the visual code is being displayed;
    generating an identifier using the data marks in the visual code;
    transmitting the identifier to a server;
    receiving, from the server, a response comprising address data for the network addressable webpage; and responsive to receiving the response, displaying the network addressable webpage on the display device of the system.

19. The system of claim 14, wherein the network addressable webpage is accessed using address data stored in the local memory of the system.

20. A machine-readable storage medium embodying instructions that,
when executed by a machine, cause the machine to perform operations comprising:
receiving an instruction to generate a visual code that can be scanned by an optical sensor of a computing device to cause the computing device to retrieve and display a network addressable webpage, the instruction including a uniform resource locator identifying the network addressable webpage;
retrieving a first group of images that is posted publicly on the network addressable webpage, the first group of images having been retrieved using the uniform resource locator;
retrieving a second group of images stored in local memory of the machine, the second group of images not being posted publicly on the network addressable webpage;
displaying, on a display of the machine, the first group of images in a first display area and the second group of images in a second display area;
receiving a selection of a first image from either the first group of images or the second group of images to integrate with the visual code;
generating the visual code, the visual code depicting data marks that encode an identifier for accessing the uniform resource locator, the visual code further depicting the first image that was selected to integrate with the visual code; and
transmitting, to a server, the identifier and the uniform resource locator for the network addressable webpage.

* * * * *